(12) United States Patent
Ohkoshi et al.

(10) Patent No.: US 9,886,978 B2
(45) Date of Patent: Feb. 6, 2018

(54) PROCESS FOR PRODUCTION OF MAGNETIC THIN FILM, MAGNETIC THIN FILM, AND MAGNETIC MATERIAL

(75) Inventors: Shin-Ichi Ohkoshi, Tokyo (JP); Asuka Namai, Tokyo (JP); Kazuyuki Takami, Tokyo (JP); Koutaro Tomita, Tokyo (JP)

(73) Assignees: The University of Tokyo, Tokyo (JP); Dowa Electronics Materials Co., Ltd., Tokyo (JP)

( * ) Notice: Subject to any disclaimer, the term of this patent is extended or adjusted under 35 U.S.C. 154(b) by 1210 days.

(21) Appl. No.: 13/378,730

(22) PCT Filed: Jun. 24, 2010

(86) PCT No.: PCT/JP2010/060770
§ 371 (c)(1),
(2), (4) Date: Dec. 16, 2011

(87) PCT Pub. No.: WO2010/150853
PCT Pub. Date: Dec. 29, 2010

(65) Prior Publication Data
US 2012/0100064 A1 Apr. 26, 2012

(30) Foreign Application Priority Data
Jun. 24, 2009 (JP) .................. 2009-149408

(51) Int. Cl.
*C01G 49/00* (2006.01)
*H01F 10/20* (2006.01)
(Continued)

(52) U.S. Cl.
CPC .............. *G11B 5/845* (2013.01); *C01G 49/00* (2013.01); *C01G 49/06* (2013.01); *C09D 5/38* (2013.01);
(Continued)

(58) Field of Classification Search
CPC ........ C01G 49/00; C01G 49/06; G11B 5/845; H01F 10/20
(Continued)

(56) References Cited

U.S. PATENT DOCUMENTS 6,063,500 A  5/2000 Kurose et al.
6,287,530 B1  9/2001 Aoyama et al.
(Continued)

FOREIGN PATENT DOCUMENTS

CN  1242028 A  1/2000
EP  0782130 A2  7/1997
(Continued)

OTHER PUBLICATIONS

Shinichi. English Translation of JP2008-063199. Published Mar. 21, 2008. Machine Translation Performed on Jan. 6, 2015 through JPO.*
(Continued)

*Primary Examiner* — Matthew E Hoban
(74) *Attorney, Agent, or Firm* — Locke Lord LLP

(57) ABSTRACT

The present invention provides a process for production of a magnetic thin film which has insulation properties, serves as a permanent magnet, and has improved residual magnetization in comparison with prior arts, the magnetic thin film, and a magnetic material. When a magnetic thin film 3 is formed, an external magnetic field with a predetermined intensity is applied to a coating liquid containing magnetic particles containing epsilon-type iron-oxide-based compounds which have insulation properties and which serve as a permanent magnet, and the coating liquid is let cured in order to form the magnetic thin film 3. Accordingly, the magnetic particles containing the epsilon-type iron-oxide-based compounds can be fixed while being oriented regularly in a magnetization direction. This realizes the process (Continued)

TEM IMAGE OF $\varepsilon$-$Al_{0.5}Fe_{1.5}O_3$ for production of the magnetic thin film 3 which has insulation properties and which serve as a permanent magnet, the magnetic thin film 3, and a magnetic material 1.

11 Claims, 11 Drawing Sheets

(51) Int. Cl.

| | | |
|---|---|---|
| *G11B 5/845* | (2006.01) | |
| *C09D 5/38* | (2006.01) | |
| *C09D 7/12* | (2006.01) | |
| *G11B 5/706* | (2006.01) | |
| *H01F 10/22* | (2006.01) | |
| *C01G 49/06* | (2006.01) | |
| *H01F 41/24* | (2006.01) | |
| *C08K 3/22* | (2006.01) | |

(52) U.S. Cl.
CPC ........ *C09D 7/1216* (2013.01); *G11B 5/70642* (2013.01); *H01F 10/22* (2013.01); *H01F 41/24* (2013.01); *C01P 2002/52* (2013.01); *C01P 2004/04* (2013.01); *C01P 2004/10* (2013.01); *C01P 2006/22* (2013.01); *C01P 2006/42* (2013.01); *C08K 3/22* (2013.01); *Y10T 428/2982* (2015.01)

(58) Field of Classification Search
USPC ............................................ 252/62.54, 62.56
See application file for complete search history.

(56) References Cited

U.S. PATENT DOCUMENTS

| | | | |
|---|---|---|---|
| 7,781,082 B2 * | 8/2010 | Ohkoshi et al. ........... | 428/836.2 |
| 2010/0171066 A1 | 7/2010 | Ohkoshi et al. | |

FOREIGN PATENT DOCUMENTS

| | | |
|---|---|---|
| JP | 63-9017 A | 1/1988 |
| JP | 09-180164 A | 7/1997 |
| JP | 2002-2119 A | 1/2002 |
| JP | 2008-63199 A | 3/2008 |
| JP | 2009-124691 A | 6/2009 |
| JP | 2009-206476 A | 9/2009 |
| WO | WO-2008/149785 A1 | 12/2008 |

OTHER PUBLICATIONS

Buschow. Concise Encyclopedia of Magnetic and Superconducting Materials. Elsevier Science; 2 edition (Dec. 28, 2005). p. 605-606.*
Jin et al. "Formation of spherical and rod-shaped $\epsilon$—$Fe_2O_3$ nanocrystals with a large coercive field." J. Mater. Chem., 15, 1067-1071, 2005.
Jin et al. "Giant Coercive Field of Nanometer-Sized Iron Oxide." Adv. Mater., 16, No. 1, 2004.
Sakurai et al. "Reorientation Phenomenon in a Magnetic Phase of $\epsilon$-$Fe_2O_3$ Nanocrystal" Journal of the Physical Society of Japan, vol. 74, No. 7, 1946-1949, 2005.
International Search Report dated Sep. 14, 2010 in PCT/JP2010/060770.
Supplementary European Search Report dated Oct. 17, 2016, issued for the corresponding European Patent Application No. 10792171.0.
Office Action issued in corresponding Chinese Patent Application No. CN201080026856.6, dated Jan. 27, 2014.

* cited by examiner

TEM IMAGE OF $\varepsilon\text{-Al}_{0.5}\text{Fe}_{1.5}\text{O}_3$

PROCESS FOR PRODUCTION OF MAGNETIC THIN FILM, MAGNETIC THIN FILM, AND MAGNETIC MATERIAL

CROSS REFERENCE TO RELATED APPLICATIONS

This application is a 371 US National Phase Application of PCT/JP2010/060770 filed Jun. 24, 2010, which claims priority to Japanese Patent Application No. JP2009-149408, filed Jun. 24, 2009, the disclosures of each of which are expressly incorporated herein by reference in their entireties.

TECHNICAL FIELD

The present invention relates to a process for production of a magnetic thin film, a magnetic thin film and a magnetic material, and is appropriate for an application of formation of a film of, for example, $\epsilon\text{-Fe}_2\text{O}_3$ that serves as a permanent magnet on a film-formation target.

BACKGROUND ART

Conventionally, a crystal structure of $\epsilon\text{-Fe}_2\text{O}_3$ is known which is a nano-order particle and which is a material that develops large coercive force of 20 kOe under a room temperature condition (see, for example, non-patent literature 1, non-patent literature 2, and non-patent literature 3).

$\epsilon\text{-Fe}_2\text{O}_3$ which has insulation properties and which serves as a permanent magnet is produced by calcinating a precursor at a temperature of substantially 1000° C. Hence, in order to produce a magnetic material like a magnetic film having a crystal structure of $\epsilon\text{-Fe}_2\text{O}_3$, a production method of producing a coating liquid of $\epsilon\text{-Fe}_2\text{O}_3$ particles produced through a calcination process together with a predetermined binder component, and applying such a liquid to a film formation target like a film or a production method of dispersing $\epsilon\text{-Fe}_2\text{O}_3$ particles in a melted or dissolved thermoplastic resin or thermosetting resin, and producing the magnetic material by a formation technique, such as extrusion or injection molding is used.

CITATION LIST

Non Patent Literature

Non-patent Literature 1: Jian Jin, Shinichi Ohkoshi and Kazuhito Hashimoto, ADVANCED MATERIALS 2004, 16, No. 1, January 5, pp. 48 to 51
Non-patent Literature 2: Jian Jin, Kazuhito Hashimoto and Shinichi Ohkoshi, JOURNAL OF MATERIALS CHEMISTRY 2005, 15, pp. 1067 to 1071
Non-patent Literature 3: Shunsuke Sakurai, Jian Jin, Kazuhito Hashimoto and Shinichi Ohkoshi, JOURNAL OF THE PHYSICAL SOCIETY OF JAPAN Vol. 74, No. 7, July, 2005, pp 1946 to 1949

SUMMARY OF INVENTION

Technical Problem

In a magnetic material having the crystal structure of $\epsilon\text{-Fe}_2\text{O}_3$ and produced through the above-explained production methods, as shown in FIG. 16, a ratio $M_r/M_s$ (hereinafter, referred to as a squareness ratio) that is a ratio of residual magnetization $M_r$ relative to saturated magnetization $M_s$ is 0.5 or so, which utilizes only half or so of the magnetic characteristic unique to the crystal structure of $\epsilon\text{-Fe}_2\text{O}_3$.

Hence, when the magnetic material is applied to the field of magnetic recording, etc., since the residual magnetization in such a magnetic material is important, it is desirable to improve the residual magnetization in comparison with conventional art in a magnetic material which has insulation properties and which has a crystal structure of $\epsilon\text{-Fe}_2\text{O}_3$ that serves as a permanent magnet.

The present invention has been made in view of the above-explained technical issue, and it is an object of the present invention to provide a process for production of a magnetic thin film, a magnetic thin film and a magnetic material which have insulation properties, serve as a permanent magnet, and which are capable of improving the residual magnetization in comparison with the conventional art.

Solution to Problem

A process for production of a magnetic thin film according to a first aspect of the present invention includes: a coating process of coating a film-formation target with a coating liquid containing magnetic particles formed of epsilon-type iron-oxide-based compounds which have insulation properties and which serve as a permanent magnet; and a formation process of letting the coating liquid cured while applying an external magnetic field with a predetermined intensity to the coating liquid applied to the film-formation target, and forming a magnetic thin film.

According to a second aspect of the present invention, the magnetic particles are each in a spherical or rod-like shape.

According to a third aspect of the present invention, the magnetic particles are each in a spherical shape, and the coating process uses the coating liquid having a solution viscosity of equal to or smaller than substantially 50 cP.

According to a fourth aspect of the present invention, the formation process uses the external magnetic field having an intensity of equal to or greater than substantially 2 T.

According to a fifth aspect of the present invention, the coating liquid used in the coating process contains the magnetic particles dispersed in a solution, the magnetic particles containing equal to or greater than 99 wt % of the epsilon-type iron-oxide-based compounds, and the magnetic particles are produced from a magnetic material slurry having a ratio of an average particle diameter by a dynamic light scattering method to an observed average particle diameter by an observation through a transmission electron microscope equal to or less than five.

According to a sixth aspect of the present invention, the epsilon-type iron-oxide-based compounds are each at least one of followings: $\epsilon\text{-Fe}_2\text{O}_3$; $\epsilon\text{-A}_x\text{Fe}_{2-x}\text{O}_3$ (where A is an element other than Fe and $0<x<2$); and $\epsilon\text{-B}_y\text{C}_z\text{Fe}_{2-y-z}\text{O}_3$ (where B and C are elements other than A and Fe and mutually different elements and $0<y<1$ and $0<z<1$).

According to a seventh aspect of the present invention, the coating liquid is mixed with water-soluble polymers or water-dispersible polymers.

A magnetic thin film according to an eighth aspect of the present invention includes magnetic particles formed of epsilon-type iron-oxide-based compounds having insulation properties and serving as a permanent magnet, the magnetic particles being oriented in a predetermined direction in accordance with an external magnetic field applied when the thin film is formed.

According to a ninth aspect of the present invention, the magnetic particles are each in a spherical or rod-like shape.

According to a tenth aspect of the present invention, the magnetic particles containing equal to or greater than 99 wt % of the epsilon-type iron-oxide-based compounds are dispersed and arranged in the magnetic thin film and a haze when the magnetic thin film is formed within a film thickness range of up to 10 μm is equal to or lower than 40%.

According to an eleventh aspect of the present invention, the epsilon-type iron-oxide-based compounds are each at least one of followings: $\varepsilon\text{-}Fe_2O_3$; $\varepsilon\text{-}A_xFe_{2-x}O_3$ (where A is an element other than Fe and $0<x<2$); and $\varepsilon\text{-}B_yC_zFe_{2-y-z}O_3$ (where B and C are elements other than A and Fe and mutually different elements and $0<y<1$ and $0<z<1$).

According to a twelfth aspect of the present invention, the magnetic particles in a predetermined area are oriented in the predetermined direction, and the magnetic particles in another area different from the predetermined area are oriented in another direction different from the predetermined direction.

According to a thirteenth aspect of the present invention, the magnetic thin film has a function of absorbing electromagnetic wave of a millimeter-wave range from 30 to 300 GHz.

A magnetic material according to a fourteenth aspect of the present invention includes the magnetic thin film according to any one of the eighth to thirteenth aspects on a film-formation target.

Advantageous Effects of Invention

According to the first aspect of the present invention, the magnetic particles containing the epsilon-type iron-oxide-based compounds can be fixed while being oriented regularly, thereby providing the production process of the magnetic thin film which has insulation properties, serves as a permanent magnet, and has the improved residual magnetization in comparison with prior arts.

According to the eighth aspect of the present invention, it is possible to provide the magnetic thin film which has insulation properties, serves as a permanent magnet, and has the improved residual magnetization in comparison with prior arts.

According to the fourteenth aspect of the present invention, it is possible to provide the magnetic material which has insulation properties, serves as a permanent magnet, and has the improved residual magnetization in comparison with prior arts.

REFERENCE SIGNS LIST

1 Magnetic material
2 Film-formation target
3 Magnetic thin film

DESCRIPTION OF EMBODIMENTS

Preferred embodiments of the present invention will be explained below.

(1) First Embodiment (1-1) Whole Structure of Magnetic Material

Figure 1:
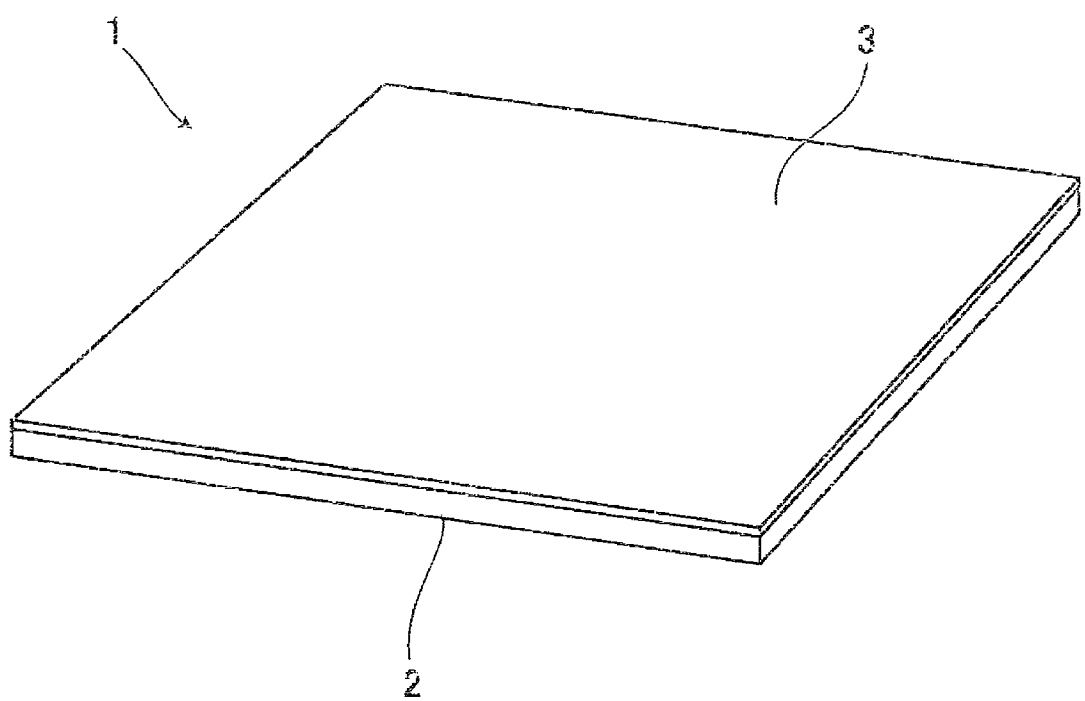
FIG. 1 is a schematic diagram showing a whole structure of a magnetic material according to the present invention.

In FIG. 1, reference numeral 1 denotes an illustrative magnetic material, such as a magnetic film or a magnetic substrate, and employs a structure in which a magnetic thin film 3 is formed on a transparent film-formation target 2, such as a PET (polyethylene terephthalate) film or a glass substrate. The magnetic material 1 according to the first embodiment has the magnetic thin film 3 that is a hard ferrite layer having transparency and insulation properties and serving as a permanent magnet. The magnetic thin film 3 also has a squareness ratio $M_r/M_s$ which is a ratio of residual magnetization $M_r$ relative to saturated magnetization $M_s$ and which is equal to or larger than 0.65.

A squareness ratio $M_r/M_s$ has a maximum value that is 1, and the larger value thereof the magnetic thin film has, the larger the residual magnetization becomes. Moreover, a term transparency means such a transparency that permits specific recognition of the shape, color, etc., of a background located at an opposite-face side of the magnetic material 1 when a user sees the magnetic material 1 from one-face side.

The magnetic thin film 3 is formed on the film-formation target 2 using a magnetic material slurry to be discussed later, and has a structure that if the film thickness to be formed is set to be substantially 0.2 to 10 μm, a haze representing a turbidity (dull level) becomes substantially equal to or lower than 40%. The magnetic material 1 can employ a multi-layer structure having various function layers conventionally well-known in addition to the structure exemplary shown in FIG. 1 as long as having transparency and the squareness ratio $M_r/M_s$ is equal to or greater than 0.65.

According to the present invention, a coating liquid produced by adjusting the coating liquid viscosity of the magnetic material slurry is applied to the film-formation target 2, and an external magnetic field with a predetermined intensity is kept applied while the coating liquid is dried and cured, thereby forming the magnetic thin film 3 having the magnetic particles oriented in a magnetization direction. In this manner, according to the present invention, the magnetic material 1 has the magnetic particles oriented in the magnetization direction by an external magnetic field before the coating liquid is cured, and let cured as it is. Accordingly, the axis of easy magnetization of the magnetic particle is oriented in the magnetization direction of the external magnetic field, and thus the magnetic thin film 3 can have the improved residual magnetization.

In the present specification, first, a brief overview of the magnetic material slurry used for the production method of the magnetic thin film 3 of the present invention will be explained, and a production method that enables improvement of the residual magnetization of the magnetic thin film 3 will be explained.

(1-2) Brief Overview of Magnetic Material Slurry (1-2-1) Structure of Magnetic Material Slurry The magnetic material slurry as a magnetic material that enables formation of the magnetic thin film 3 which has transparency and insulation properties and which serves as a permanent magnet contains magnetic particles (hereinafter, referred to as $\in\text{-Fe}_2\text{O}_3$ particles) dispersed in a solution, and such magnetic particles contain magnetic iron-oxide-based compounds of equal to or greater than 99 wt % which have a general formula expressed as $\in\text{-Fe}_2\text{O}_3$.

The magnetic material slurry of the first embodiment has features that such a slurry is added with calcium ions as needed as a shape control agent in a production process thereof, and is produced through a purification process with moisture being left by not through a dry process. The magnetic particles are formed in a rod-like shape when the shape control agent like calcium ions is added in the production process, and are formed in a spherical shape when no shape control agent is added.

In the present embodiment, the explanation is given of the case in which the present invention is applied to the magnetic material slurry containing the magnetic particles containing equal to or greater than 99 wt % of $\in\text{-Fe}_2\text{O}_3$, but the present invention is not limited to this case. A magnetic material slurry may be applied which contains magnetic particles (hereinafter, referred to as $\in\text{-A}_x\text{Fe}_{2-x}\text{O}_3$ particles) containing equal to or greater than 99 wt % of magnetic-iron-oxide-based compounds having a general formula expressed as $\in\text{-A}_x\text{Fe}_{2-x}\text{O}_3$ (where A is an element other than Fe, and x is within a range of 0<x<2).

As other embodiments, a magnetic material slurry may be applied which contains magnetic particles (hereinafter, referred to as $\in\text{-B}_y\text{C}_z\text{Fe}_{2-y-z}\text{O}_3$ particles) containing equal to or greater than 99 wt % of magnetic-iron-oxide-based compounds having a general formula expressed as $\in\text{-B}_y\text{C}_z\text{Fe}_{2-y-z}\text{O}_3$ (where B and C are elements other than A and Fe and different from each other, y is within a range of 0<y<1, and z is within a range of 0<z<1).

The magnetic material slurry containing magnetic particles containing equal to or greater than 99 wt % of either one of $\in\text{-Fe}_2\text{O}_3$, $\in\text{-A}_x\text{Fe}_{2-x}\text{O}_3$ and $\in\text{-B}_y\text{C}_z\text{Fe}_{2-y-z}\text{O}_3$ (hereinafter, those are collectively referred to as epsilon-type iron-oxide-based compounds) is added with calcium ions as needed as a shape control agent in the production process, and has a structure in which Si (Silicon) components contained in the epsilon-type iron-oxide-based compounds are reduced to a concentration of substantially equal to or lower than 1 wt %.

Moreover, the magnetic material slurry containing the magnetic particles containing equal to or greater than 99 wt % of epsilon-type iron-oxide-based compounds is subjected to a purification process in the production process with moisture being left by not through a dry process. As a result, a structure is employed in which the magnetic particles containing equal to or greater than 99 wt % of epsilon-type iron-oxide-based compounds are uniformly dispersed in a solution.

(1-2-2) When Magnetic Particle is in Rod-Like Shape

If, for example, it is attempted to obtain a transparent high-hardness thin film utilizing the magnetic particles in a rod-like shape, in general, one of a requisite condition is that the shape is a rod-like shape having a long-axis size of 100 nm to several hundred nm. The magnetic particles containing equal to or greater than 99 wt % of epsilon-type iron-oxide-based compounds are formed so as to have an external shape having a predetermined long-axis size (equal to or greater than 100 nm) by calcium ions, and in this case it is preferable that such particles should be $\in\text{-Fe}_2\text{O}_3$ particles.

Moreover, in order to design a functional material with a magnetic domain wall displacement by providing a magnetic domain wall (a boundary between a magnetic domain and another magnetic domain and where the direction of magnetization gradually changes) in the rod-like $\in\text{-Fe}_2\text{O}_3$ particles, it is necessary to synthesize rod-like $\in\text{-Fe}_2\text{O}_3$ particles having a long-axis size of equal to or greater than several hundred nm which can produce an appropriate magnetic domain wall. In order to optimize the desired magnetic function and thin-film characteristic as explained above, rod-like $\in\text{-Fe}_2\text{O}_3$ particles matching the objective characteristic are synthesized, which is one of the features of the present invention. The rod-like magnetic particles produced in the magnetic material slurry have an a-axis (a crystal axis along the lengthwise direction) that is a crystal axis which serves as an axis of easy magnetization.

(1-2-3) When Magnetic Particle is in Spherical Shape

The magnetic material slurry of the present invention has the magnetic particles formed in a spherical shape when no shape control agent like calcium ions is added in the production process. That is, when no calcium ion is added in the production process of the magnetic material slurry, the magnetic particles containing equal to or greater than 99 wt % of epsilon-type iron-oxide-based compounds are formed in a spherical shape, and such magnetic particles can be contained in a solution. The spherical magnetic particles

(1-2-4) Detailed Structures of $\varepsilon\text{-}A_xFe_{2-x}O_3$ Particles and $\varepsilon\text{-}B_yC_zFe_{2-y-z}O_3$ Particles According to Other Embodiments In the case of $\varepsilon\text{-}A_xFe_{2-x}O_3$ particles having one kind of element substituted by some of $Fe^{3+}$ ion sites, it is preferable that a trivalent element should be used as A in order to stably maintain the crystal structure of $\varepsilon\text{-}Fe_2O_3$. Moreover, an example of A is one kind of element selected from the following group: Al; Sc; Ti; V; Cr; Ga; In; and Y.

Among those elements, Al and Ga can be substituted with Fe4 site which is some of $Fe^{3+}$ ion sites, and Sc, Ti, V, Cr, In and Y can be substituted with Fe1 site which is some of $Fe^{3+}$ ion sites.

Conversely, in the case of $\varepsilon\text{-}B_yC_zFe_{2-y-z}O_3$ particles that have two different kinds of elements replaced with some of $Fe^{3+}$ ion sites, it is preferable to use a quadrivalent element as B and a bivalent element as C in order to stably maintain the crystal structure of $\varepsilon\text{-}Fe_2O_3$. An example of B is Ti and that of C is one kind of element selected from the followings: Co; Ni; Mn; Cu; and Zn.

Ti constituting the above-explained B can be substituted with Fe4 site that is some of $Fe^{3+}$ ion sites. Moreover, Co, Ni, Mn, Cu and Zn constituting the above-explained C can be all substituted with Fe1 site that is some of $Fe^{3+}$ ion sites.

The reason why Fe is eliminated from the above-explained A, B, and C is to substitute some of $Fe^{3+}$ ion sites of $\varepsilon\text{-}Fe_2O_3$ with one kind of or two different kinds of elements.

(1-2-5) Dispersion

The shape of magnetic particles formed of the epsilon-type iron-oxide-based compounds is not limited to any particular one, and examples of such a shape are a rod-like shape and a spherical shape, but it is preferable that such a shape should be a spherical or a rod-like shape that facilitates orientation of the magnetic particles formed of the epsilon-type iron-oxide-based compounds by an external magnetic field. An example of the solvent contained in the magnetic material slurry is a water-soluble solvent. Moreover, an additive agent may be further contained as needed.

An explanation will be given below of the dispersion of the magnetic particles formed of epsilon-type iron-oxide-based compounds when the magnetic particles are in a rod-like shape at first. When, for example, the magnetic particles formed of the epsilon-type iron-oxide-based compounds are in a rod-like shape, it is difficult to generally define since such a shape changes depending on its application, but in general, one having a cross-sectional circular shape in a radial direction with a short-axis size of 5 to 50 nm and a long-axis size in the lengthwise direction of 10 to 1000 nm when observed through a transmission electron microscope is preferable.

In the case of this embodiment, magnetic particles in a rod-like shape (hereinafter, for easiness of explanation, referred to as rod-like magnetic particles) containing equal to or greater than 99 wt % of epsilon-type iron-oxide-based compounds are dispersed in a solution, and the dispersion representing the degree of dispersion of the rod-like magnetic particles can be expressed $$\text{Dispersion} = \text{apparent average particle diameter calculated by dynamic light scattering method/observed average particle diameter (long-axis size) by transmission electron microscope observation} \quad \text{[Formula 1]}$$

by the formula.

An observed average particle diameter means an average value of the long-axis size in the case of the rod-like magnetic particles.

Dynamic light scattering method means a technique of emitting laser light to particles dispersed in a solution, and obtaining the particle diameter of the particle dispersed in the solution by analyzing the scattered light.

As explained above, the dispersion is a ratio of an average particle diameter by dynamic light scattering method relative to an observed average particle diameter by transmission electron microscope observation, and indicates that the smaller the value is, the smaller the agglomerate is.

When the dispersion becomes larger than 5, the magnetic material slurry has the larger agglomerate, and the transparency of the magnetic thin film formed by the magnetic material slurry decreases. Hence, it is preferable that the dispersion should be equal to or smaller than 5 in the first embodiment.

Next, an explanation will be given below of the dispersion when the magnetic particles formed of the epsilon-type iron-oxide-based compounds are in a spherical shape. When the magnetic particles formed of the epsilon-type iron-oxide-based compounds are in a spherical shape, it is difficult to generally define since such a shape changes depending on its application, but in general, one having an observed average particle diameter of 5 to 500 nm when observed through a transmission electron microscope is preferable. An observed average particle diameter means, in the case of magnetic particles in a spherical shape (hereinafter, for easiness of explanation, referred to as spherical magnetic particles) containing equal to or greater than 99 wt % of epsilon-type iron-oxide-based compounds, an average value of the particle diameters of spherical magnetic particles. In the case of the spherical magnetic particles, the dispersion representing the degree of dispersion of the spherical magnetic particles can be expressed $$\text{Dispersion} = \text{apparent average particle diameter calculated by dynamic light scattering method/observed average particle diameter by transmission electron microscope observation} \quad \text{[Formula 2]}$$

by the formula, and it is preferable like the above-explained case that the dispersion should be equal to or smaller than 5 in the first embodiment.

(1-2-6) Production Method of Magnetic Material Slurry

The magnetic material slurry which has transparency and insulation properties and which enables formation of a magnetic thin film serving as a permanent magnet can be produced by a combination of, for example, the reverse micelle technique and the sol-gel technique as explained below. As long as silica-coated ferric-hydroxide-based compound particles having a particle diameter equal to or smaller than 100 nm can be synthesized, the synthesis technique is not limited to any particular one.

More specifically, first, a surfactant agent (e.g., cetyltrimethylammonium bromide) is dissolved in a solution of an aqueous phase having n-octane as an oil phase, thereby producing a micelle solution.

Next, iron nitrate (III) is dissolved in the micelle solution, and calcium ions are dissolved therein as needed, thereby producing a raw-material solution.

A feature of the present invention is to dissolve calcium ions in the micelle solution as needed in the process of producing the raw-material solution. According to the present invention, as long as calcium ions can be dissolved in the micelle solution, various compositions, such as calcium nitrate, calcium chloride, and calcium hydroxide, can be dissolved in the micelle solution.

Calcium ions function as a shape control agent, and when an appropriate amount thereof is dissolved, $\epsilon\text{-Fe}_2\text{O}_3$ particles of a single phase can be shaped in a rod-like shape. However, calcium ions may remain on the surface layer of the crystal to be produced. In this case, if the contained amount of balanced calcium ions does not exceed 8 wt %, the effect of the shape control agent to other physicality is little. Hence, calcium ions as the shape control agent can be added in the amount of equal to or smaller than 8 wt % to the raw-material solution.

Moreover, separately from the production of the raw-material solution, a neutralizer like an ammonium aqueous solution, etc., is mixed in a micelle solution obtained by dissolving a surfactant agent (e.g., cetyltrimethylammonium bromide) in a solution of an aqueous phase having n-octane as an oil phase, thereby producing a neutralizer solution.

Next, the raw-material solution and the neutralizer solution are stirred and mixed by the reverse micelle technique in order to produce a mixed solution, and the precipitation reaction of the ferric-hydroxide-based compound particles is let progressed in the mixed solution.

Subsequently, a solution of silane compounds is added appropriately to the mixed solution, thereby causing the surfaces of the ferric-hydroxide-based compound particles to be coated with silica by the sol-gel technique. Such a reaction is carried out in the mixed solution, and in the mixed solution, hydrolysis is performed on the surfaces of the minute ferric-hydroxide-based compound particles in the nano order, thereby producing the ferric-hydroxide-based compound particles having the surfaces thereof coated with silica (hereinafter, referred to as silica-coated ferric-hydroxide-based compound particles).

Figure 2:
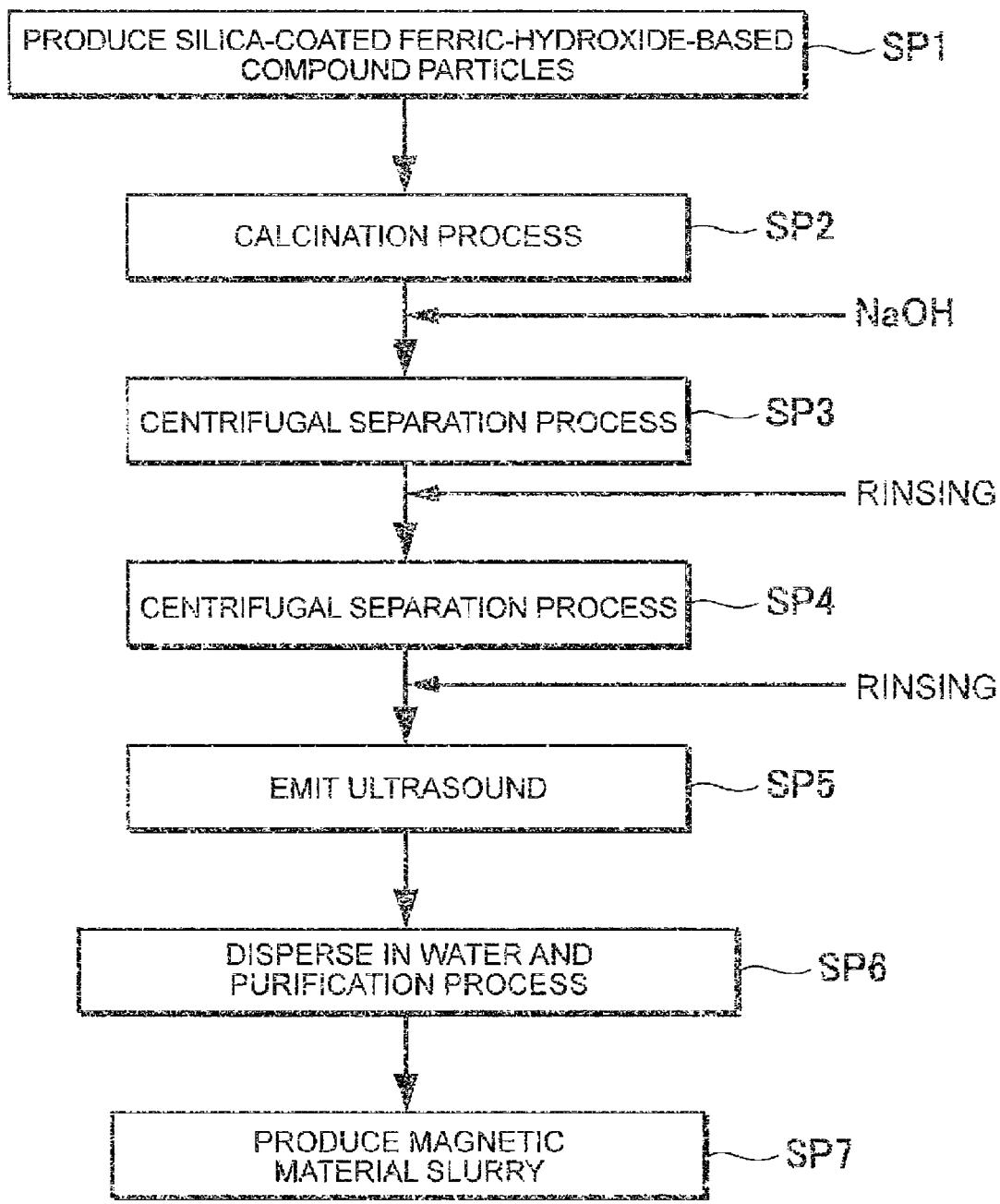
FIG. 2 is a flowchart showing an outline of a production method of a magnetic material slurry according to a first embodiment.

Next, according to this production method, as shown in FIG. 2, after the silica-coated ferric-hydroxide-based compound particles are produced (step SP1), the silica-coated ferric-hydroxide-based compound particles are separated from the mixed solution, and are subjected to a calcination process at a predetermined temperature (within a range from 700 to 1300° C.) under an air atmosphere (step SP2). Through the calcination process, the silica-coated ferric-hydroxide-based compound particles produce minute $\epsilon\text{-Fe}_2\text{O}_3$ particles by an oxidation reaction inside the silica shells.

That is, according to such silica-coated ferric-hydroxide-based compound particles, it is thought that the fact the ferric-hydroxide-based compound particles are coated by silica at the time of this oxidation reaction attributes to the production of not $\alpha\text{-Fe}_2\text{O}_3$ and $\gamma\text{-Fe}_2\text{O}_3$ but $\epsilon\text{-Fe}_2\text{O}_3$ of a single phase. In addition, coating by silica has an effect of suppressing a sintering of particles. As explained above, when an appropriate amount of calcium ions as the shape control agent are present together, it facilitates the rod-like $\epsilon\text{-Fe}_2\text{O}_3$ particles to be grown as single-phase particles.

When the raw-material solution is produced through the above-explained production process, if an appropriate amount of $A_x$ is dissolved in the micelle solution, it becomes possible to produce single phase particles of $\epsilon\text{-A}_x\text{Fe}_{2-x}\text{O}_3$ particles which have the same crystal structure as that of $\epsilon\text{-Fe}_2\text{O}_3$ and which have some of $Fe^{3+}$ ion sites substituted. When an appropriate amount of aluminum nitrate is dissolved as $A_x$, it is possible to produce spherical $\epsilon\text{-Al}_x\text{Fe}_{2-x}\text{O}_3$ particles containing epsilon-type iron-oxide-based compounds.

Moreover, when the raw-material solution is produced through the above-explained production process, if appropriate amounts of $B_y$ and $C_z$ are dissolved in the micelle solution, it becomes possible to produce single phase particles of $\epsilon\text{-B}_y\text{C}_z\text{Fe}_{2-y-z}\text{O}_3$ particles which have the same crystal structure as that of $\epsilon\text{-Fe}_2\text{O}_3$ and which have some of $Fe^{3+}$ ion sites substituted.

Next, thermally processed powders formed of, for example, $\epsilon\text{-Fe}_2\text{O}_3$ particles produced through the above-explained production process of the $\epsilon\text{-Fe}_2\text{O}_3$ particles are added in an NaOH aqueous solution, stirred for a predetermined time at a predetermined temperature, and are subjected to a centrifugal separation process by a centrifugal separator (step SP3). Subsequently, depositions obtained through the centrifugal separation are collected and rinsed, thereby eliminating silica covering the surfaces of the $\epsilon\text{-Fe}_2\text{O}_3$ particles.

Such collection procedures are carried out by predetermined times (e.g., twice) (step SP4), thereby surely eliminating silica covering the surfaces of the $\epsilon\text{-Fe}_2\text{O}_3$ particles. Next, ultrasound is emitted in order to cause the $\epsilon\text{-Fe}_2\text{O}_3$ particles to be dispersed (step SP5), and a purification process including a pH adjustment and a solid content concentration adjustment is performed by not through a dry process with such particles being dispersed in a liquid (step SP6).

Hence, the magnetic material slurry that contains the magnetic particles containing equal to or greater than 99 wt % of epsilon-type iron-oxide-based compounds which have insulation properties and which serve as a permanent magnet and dispersed in a solution is produced (step SP7) and the magnetic particles contained in such a slurry have the ratio of an average particle diameter by a dynamic light scattering method relative to an observed average particle diameter by transmission electron microscope observation which is equal to or smaller than 5.

Such a magnetic material slurry was subjected to various verification tests, and it is confirmed from the increasing tendency of a haze and that of a film thickness that the haze can be equal to or lower than 30% even if the film thickness is set to be 0.1 μm, and the haze can be equal to or lower than 40% even if the film thickness is set to be 10 μm. Moreover, according to this magnetic material slurry, since the haze gradually increases together with the increase of the film thickness, it is confirmed that the transparency can be easily maintained even if the film thickness is increased and insulation properties are ensured based on a measured resistance value.

(1-3) Production Method of Magnetic Thin Film

Next, a predetermined amount of water is added in the magnetic material slurry produced in this manner, thereby producing a coating liquid having the coating liquid viscosity adjusted. Examples of the magnetic particles contained in the magnetic material slurry are spherical magnetic particles and rod-like magnetic particles as explained above. According to the coating liquid (hereinafter, referred to as a spherical-particle-containing coating liquid) produced using the magnetic material slurry containing the spherical magnetic particles between those, when the coating liquid viscosity becomes equal to or greater than a predetermined value, the squareness ratio $M_r/M_s$ decreases. Accordingly, the coating liquid viscosity is adjusted to be equal to or smaller than a predetermined value so that the squareness ratio $M_r/M_s$ becomes equal to or greater than 0.65. According to the coating liquid (hereinafter, referred to as a rod-like-particle-containing coating liquid) produced using the magnetic material slurry containing the rod-like magnetic particles, even if the coating liquid viscosity is high, the squareness ratio $M_r/M_s$ does not decrease, and becomes equal to or greater than 0.65. Therefore, a particular adjustment of the coating liquid viscosity is unnecessary (which will be discussed in "examples").

Either one coating liquid of the spherical-particle-containing coating liquid and the rod-like-particle-containing coating liquid is applied to the film-formation target 2 in order to form the magnetic thin film 3. At this time, according to the present invention, during a time period until the coating liquid is dried and cured, an external magnetic field with a predetermined intensity is continuously applied from a predetermined direction by magnetic-field applying means like an unillustrated superconducting magnet. The intensity of the external magnetic field is set based on, for example, the performance of the magnetic particles, the shape of the magnetic particles, the viscoelastic characteristic of the coating liquid, and the strength of the mutual effect between the components of the coating liquid and the magnetic material, but it is sufficient if such an intensity can rotate the magnetic particles on the film-formation target 2 and orient the particles in a predetermined magnetization direction regularly.

Moreover, before the coating liquid is dried on the film-formation target 2 and cured, if application of the external magnetic field is terminated, the magnetic particles oriented in the predetermined magnetization direction by the external magnetization are allowed to freely change the orientation condition. Hence, when the thin film is formed, it is preferable to keep applying the external magnetic field until the magnetic particles are arranged regularly in the magnetization direction and the coating liquid is cured in this condition by applying the external magnetic field to the coating liquid under an environment in which the magnetic particles can freely rotate.

The following is an illustrative technique of curing the coating liquid. For example, a method of letting the magnetic particles in a lean condition and particles and molecules with cohesion force (hereinafter, referred to as cohesive components) to be present together in an arbitrary solvent in order to prepare a coating liquid, and of using such a coating liquid can be adopted. In this case, right after the coating liquid is applied, the cohesive components are in a lean condition, and the magnetic particles are in an environment freely rotatable. Accordingly, if the external magnetic field is applied in this condition, the magnetic particles can be oriented in the magnetization direction. Thereafter, the coating liquid is volatilized, the solution viscosity of the matrix remarkably increases together with the increase of the concentration of the cohesive components, and eventually, the magnetic particles oriented in the magnetization direction can be fixed as those are.

Another illustrative method of curing the coating liquid is a method of using a coating liquid containing the magnetic particles and an adhesive with a thermosetting property (hereinafter, referred to as a thermosetting adhesive) present together. In this case, right after the coating liquid is applied, the thermosetting adhesive is in an unreacted condition, and the magnetic particles are in an environment freely rotatable. Accordingly, if the external magnetic field is applied in this condition, the magnetic particles can be oriented in the magnetization direction. Thereafter, the solution viscosity of the matrix remarkably increases together with curing of the thermosetting adhesive by heating thereof, and eventually, the magnetic particles oriented in the magnetization direction can be fixed as those are.

The other illustrative method of curing the coating liquid is a method of using a coating liquid containing the magnetic particles and an adhesive which is responsive to and cured by light (hereinafter, referred to as photo-curable adhesive) present together. In this case, right after the coating liquid is applied, the photo-curable adhesive is in an unreacted condition, and the magnetic particles are in an environment freely rotatable. Accordingly, if the external magnetic field is applied in this condition, the magnetic particles can be oriented in the magnetization direction. Thereafter, the solution viscosity of the matrix remarkably increases together with curing of the photo-curable adhesive by being irradiated with light, and eventually, the magnetic particles oriented in the magnetization direction can be fixed as those are.

The further other illustrative method of curing the coating liquid is a method of using a coating liquid produced by mixing the magnetic particles and a thermoplastic resin. In this case, if the coating liquid sufficiently heated and melted is applied, right after the application of the coating liquid, the thermoplastic resin is in a melted condition, and the magnetic particles are in an environment freely rotatable. Accordingly, if the external magnetic field is applied in this condition, the magnetic particles can be oriented in the magnetization direction. Thereafter, the solution viscosity of the matrix remarkably increases together with curing of the thermoplastic resin by cooling thereof, and eventually, the magnetic particles oriented in the magnetization direction can be fixed as those are.

(1-4) Working and Effect

According to the production method of the magnetic material slurry used for producing the magnetic thin film 3 and employing the above-explained structure, the raw-material solution obtained by dissolving ferric nitrate (III) in a micelle solution and a neutralizer solution obtained by adding a neutralizer in a micelle solution are mixed in order to produce a mixed solution, and the precipitation reaction of the ferric-hydroxide-based compound particles is let progressed in the mixed solution. Next, silane compounds are added in the mixed solution in order to produce silica-coated ferric-hydroxide-based compound particles having the surfaces of the ferric-hydroxide-based compound particles coated with silica. Subsequently, the silica-coated ferric-hydroxide-based compound particles are separated from the mixed solution, and are calcined at a predetermined temperature, thereby producing heat-treated powders.

At last, silica covering the surfaces of the heat-treated powders are eliminated by putting the heat-treated powders in an aqueous solution, and magnetic particles containing equal to or greater than 99 wt % of epsilon-type iron-oxide-based compounds are produced and are subjected to a purification process with moisture being left by not through a dry process. According to the present invention, through such a process, it becomes possible to produce a magnetic material slurry that enables formation of the magnetic thin film 3 which has insulation properties, serves as a permanent magnet, and is transparent on the film-formation target 2.

According to this production method, since no shape control agent is added in the raw-material solution, it becomes possible to produce spherical magnetic particles containing equal to or greater than 99 wt % of epsilon-type iron-oxide-based compounds, and to produce a magnetic material slurry containing such spherical magnetic particles. Conversely, when, for example, calcium ions as a shape control agent are added in the raw-material solution when the mixed solution is produced by this production method, it becomes possible to produce rod-like magnetic particles containing equal to or greater than 99 wt % of epsilon-type iron-oxide-based compounds, and to produce a magnetic material slurry containing such rod-like magnetic particles.

When the magnetic thin film 3 is produced using such a magnetic material slurry, water is added in the magnetic material slurry containing the spherical magnetic particles or the rod-like magnetic particles containing epsilon-type iron-oxide-based compounds which serve as a permanent magnet, and a coating liquid with a predetermined coating liquid viscosity is produced. This coating liquid is applied to the film-formation target 2, and the external magnetic field of equal to or greater than substantially 2 T is continuously applied when the coating liquid is cured.

Hence, according to this production method of the magnetic thin film 3, the magnetic particles formed of the epsilon-type iron-oxide-based compounds can be fixed while being oriented regularly in the magnetization direction by the external magnetic field, and thus the magnetic thin film 3 having a squareness ratio $M_r/M_s$ of equal to or greater than 0.65 can be formed.

Moreover, according to this production method of the magnetic thin film 3, by using the magnetic material slurry containing, for example, the rod-like magnetic particles, it is possible to easily orient the rod-like magnetic particles in the magnetization direction by the external magnetic field regardless of the coating liquid viscosity of the rod-like-particle-containing coating liquid.

According to the above-explained structure, when the magnetic thin film 3 is formed, an external magnetic field with a predetermined intensity is applied to the coating liquid containing the magnetic particles formed of epsilon-type iron-oxide-based compounds which have insulation properties and which serve as a permanent magnet, and the coating liquid is cured with this condition being maintained. Accordingly, it becomes possible to let the magnetic particles formed of the epsilon-type iron-oxide-based compounds cured while being oriented in the magnetization direction regularly, and thus the insulation properties and the function as a permanent magnet are obtained, while at the same time, the residual magnetization is improved in comparison with prior arts.

(2) Second Embodiment

Figure 3:
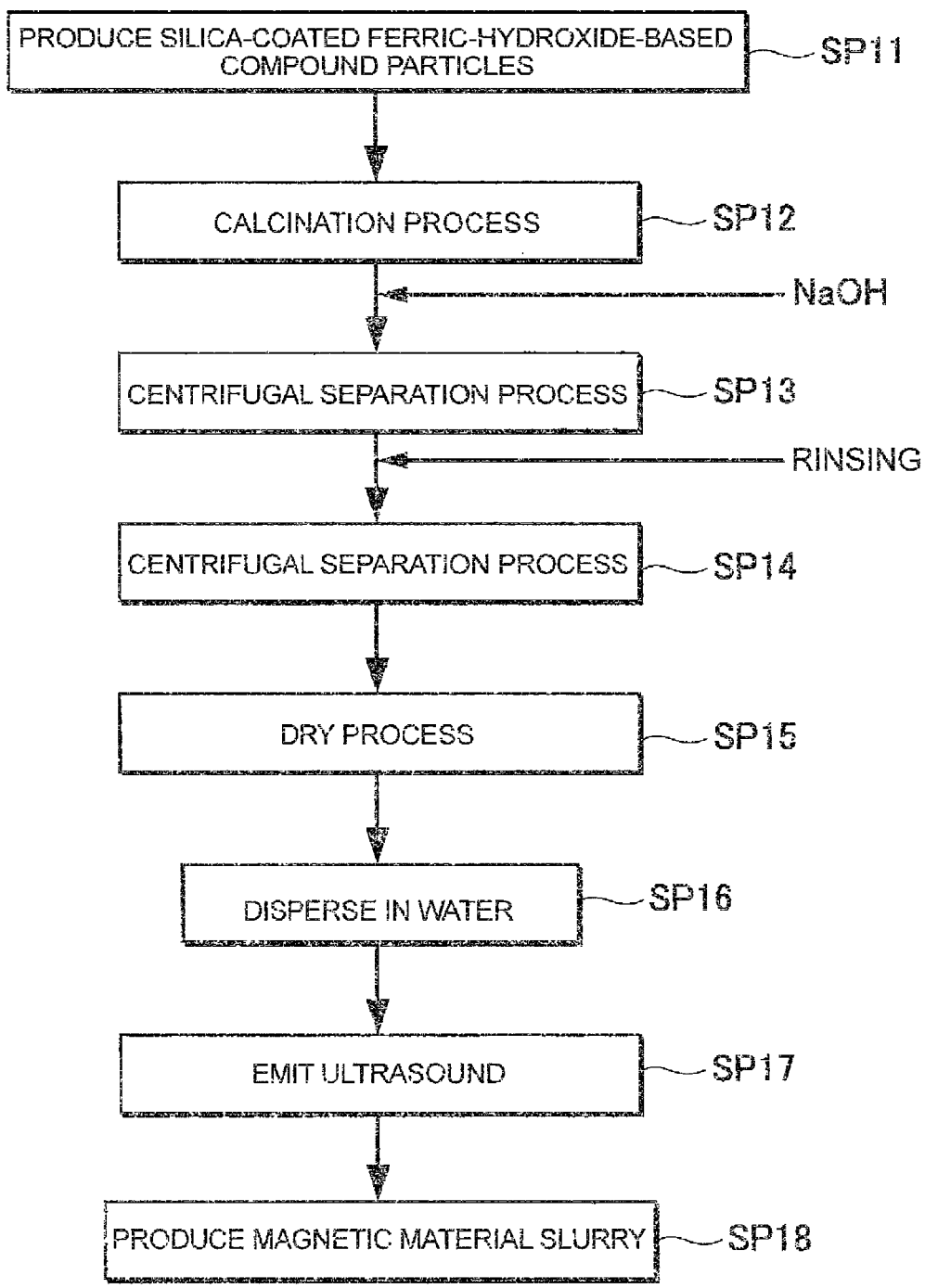
FIG. 3 is a flowchart showing an outline of a production method of a magnetic material slurry according to a second embodiment.

According to a second embodiment, a magnetic material slurry for forming the magnetic thin film 3 is different from that of the first embodiment, and as shown in FIG. 3, the only difference from the first embodiment is that such a magnetic material slurry is produced through a dry process (step SP15) that is not included in the production process of the magnetic material slurry according to the first embodiment. According to the magnetic material slurry of the present embodiment, since it is through the dry process in the production process, the dispersion properties are less than those of the magnetic material slurry according to the first embodiment, and the transparency of the magnetic thin film becomes low.

The magnetic material slurry can be produced through, for example, the following production process. First, after silica-coated ferric-hydroxide-based compound particles are produced (step SP11), and a calcination process of calcining the silica-coated ferric-hydroxide-based compound particles as a precursor is performed at a temperature of substantially 1000° C. in order to cause such particles to be powders, thereby producing heat-treated powders (step SP12). Next, the heat-treated powders are added in an NaOH aqueous solution of 10 wt %, stirred for a day at a temperature of 70° C., and subjected to a centrifugal separation process by a centrifugal separator, and precipitates are collected and rinsed (step SP13).

Next, the rinsed precipitates are added again in an NaOH aqueous solution of 10 wt %, stirred for a day at a temperature of 70° C., and subjected to a centrifugal separation process by a centrifugal separator (step SP14), and precipitates are collected and rinsed. The collected precipitates become $\in$-$Fe_2O_3$ particles having silica ($SiO_2$) eliminated.

Subsequently, unlike the above-explained first embodiment, a dry process of letting the $\in$-$Fe_2O_3$ particles dried is performed (step SP15). Thereafter, the dried $\in$-$Fe_2O_3$ particles are dispersed in water (step SP16), added in and mixed with a solution with an adjusted pH, and a solid content concentration is adjusted (by a purification process). Next, it is irradiated with ultrasound (step SP17), thereby producing the magnetic material slurry containing the $\in$-$Fe_2O_3$ particles (step SP18).

According to such a magnetic material slurry produced in this manner, it is possible to form the magnetic thin film 3 which has insulation properties, is a hard ferrite layer serving as a permanent magnet and has the squareness ratio $M_r/M_s$ of equal to or greater than 0.65 through the above-explained "(1-3) Production Method of Magnetic Thin Film".

The present invention is not limited to the above-explained embodiments, and can be changed and modified in various forms within the scope and spirit of the present invention. For example, in the above-explained embodiments of the present invention, the explanation was given of the case in which calcium ions as a shape control agent are added in the raw-material solution used for producing the magnetic material slurry. The present invention is, however, not limited to this case, and barium nitrate instead of calcium ions may be added as a shape control agent to the raw-material solution used for producing the magnetic material slurry.

According to the magnetic material slurry using the shape control agent other than calcium ions, Si components are not sufficiently eliminated, and the amount of Si components becomes high in comparison with the magnetic material slurry of the first embodiment, and thus the transparency of the magnetic thin film becomes low. It is sufficient that the magnetic material slurry used for the production method of the magnetic thin film 3 of the present invention is one in short that contains the magnetic particles containing epsilon-type iron-oxide-based compounds which have insulation properties and which serve as a permanent magnet.

Moreover, according to the embodiments of the present invention, the explanation was given of the case in which the magnetic thin film 3 is produced which has the magnetic particles oriented in one direction along the predetermined magnetization direction by applying an external magnetic field in one direction when the thin film is formed. The present invention is, however, not limited to this case, and a magnetic thin film may be formed which has the magnetic particles oriented in any of various predetermined directions, such as a spiral direction and a curved direction, along the magnetization direction by changing the magnetization direction of the external magnetic field in various magnetization directions, such as a spiral direction, etc.

Moreover, as the other embodiment, the magnetization direction of an external magnetic field may be changed for each area of the film-formation target 2 when the external magnetic field is applied. In this case, by changing the magnetization direction of the external magnetic field for each area of the film-formation target 2 to which the external magnetic field is applied, the magnetic thin film having the magnetic particles in a predetermined area oriented in a predetermined direction and the magnetic particles in another area different from that predetermined area oriented in another direction different from the predetermined direction can be produced.

(3) Examples (3-1) Effect of External Magnetic Field

As an example, a magnetic material slurry containing 5 wt % of spherical $\in$-$Al_{0.5}Fe_{1.5}O_3$ particles was mixed with a PVA 1000 aqueous solution of 5 wt % at a ratio by weight of 1:1, and thus a solution (spherical-particle-containing coating liquid) was produced.

Next, the spherical-particle-containing coating liquid was applied on the film-formation target 2, and a plurality of magnetic thin films 3 were formed on the film-formation target 2 while external magnetic fields with different intensities: substantially 0 T; 1 T; 2 T; 4 T; 6 T; 8 T; and 10 T were respectively applied. Next, respective squareness ratios $M_r/M_s$ of the magnetic thin films 3 were measured and compared one another. The term $M_s$ represents a magnetization when the external magnetic field of 5 T was applied and the term $M_r$ represents a magnetization when the external magnetic field of 500 Oe was applied thereafter.

Figure 4:
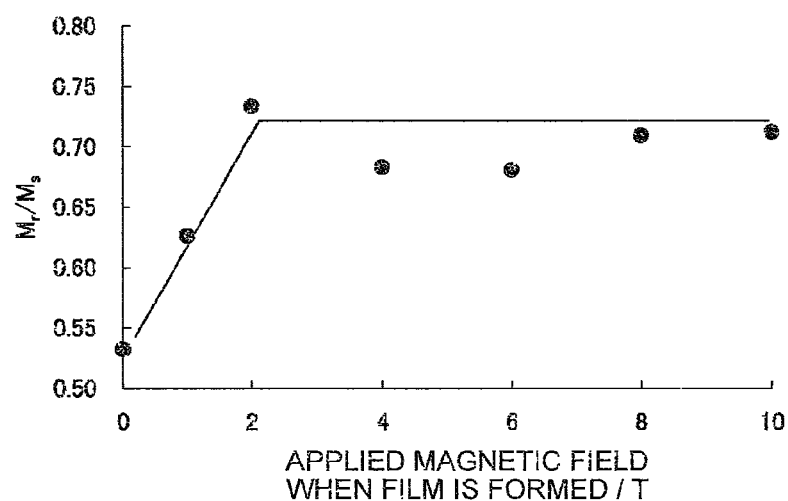
FIG. 4 is a graph showing a relationship between a squareness ratio and the intensity of an external magnetic field.

As a result, a measurement result shown in FIG. 4 was obtained. As shown in FIG. 4, the squareness ratio $M_r/M_s$ had a tendency to increase up to substantially 2 T of the external magnetic field, but no large change was confirmed over substantially 2 T.

Although the explanation was given of a case in which the magnetic material slurry containing spherical magnetic particles was used in the above-explained measurement test, when the magnetic material slurry containing rod-like magnetic particles is used, an external magnetic field of equal to or greater than 2 T is necessary in order to obtain a highly oriented film having the rod-like magnetic particles oriented regularly in the magnetization direction by the external magnetic field.

(3-2) Time Period of Applying External Magnetic Field

Figure 5:
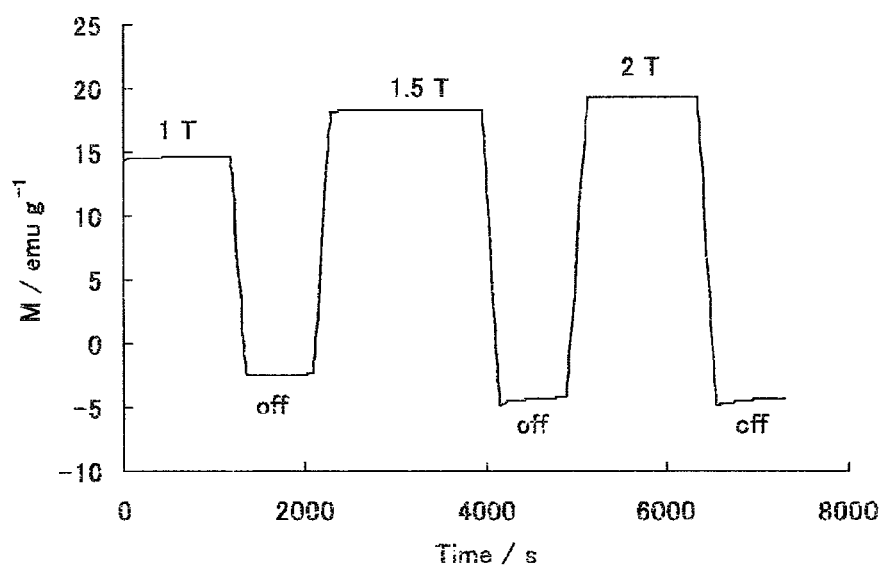
FIG. 5 is a graph showing magnetization when an external magnetic field is applied and when an application of the external magnetic field is terminated.

After a certain external magnetic field was applied to the spherical-particle-containing coating liquid produced through the above-explained process, magnetization was measured when the application of the external magnetic field was terminated before the spherical-particle-containing coating liquid was cured. As a result, a measurement result shown in FIG. 5 was obtained. As shown in FIG. 5, when the application of the external magnetic field was terminated, it was confirmed that the magnetization was already lost after substantially 200 s (a minimum unit). Based on this result, it was confirmed that the orientation of the aligned spherical magnetic particles was disarranged when the application of the external magnetic field was terminated before the spherical-particle-containing coating liquid was cured even if the spherical magnetic particles were once oriented in the magnetization direction.

That is, it was confirmed that under an environment in which the spherical magnetic particles were able to freely rotate, when the external magnetic field was applied, the spherical magnetic particles became an oriented condition in response to the external magnetic field. However, it became clear that when the application of the external magnetic field was terminated, the orientation of the aligned spherical magnetic particles was disarranged in accordance with the entropy. Moreover, it also became clear that the responsiveness thereof was quite fast. Hence, it became clear that when the magnetic thin film 3 of the present invention is formed, it is necessary to apply an external magnetic field in order to align the spherical magnetic particles while creating an environment in which the spherical magnetic particles can freely rotate, to keep applying the external magnetic field at least when the spherical-particle-containing coating liquid is cured, and to cause the spherical magnetic particles to be not freely rotatable by the external magnetic field when the spherical-particle-containing coating liquid is cured.

Although the explanation was given of a case in which the magnetic material slurry containing the spherical magnetic particles was used in the above-explained verification test, when the magnetic material slurry containing the rod-like magnetic particles is used, it is also necessary to make the rod-like magnetic particles not freely rotatable by the external magnetic field when the rod-like-particle-containing coating liquid is cured.

Figure 6:
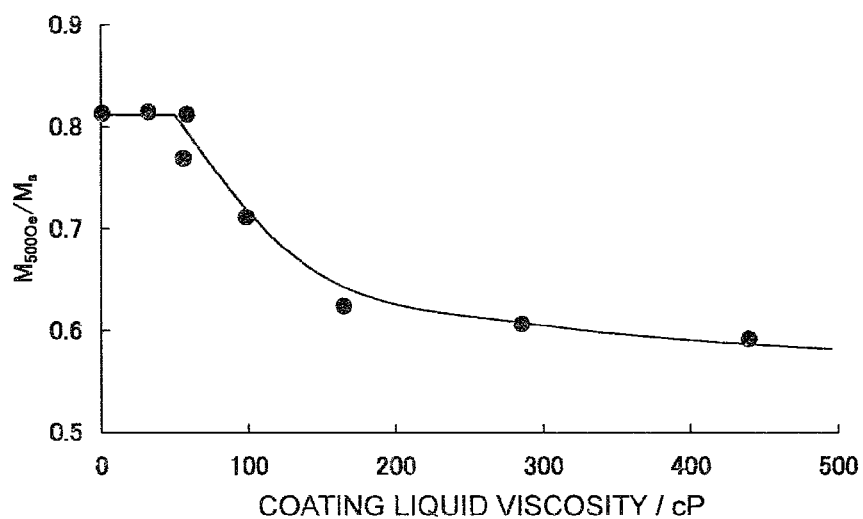
FIG. 6 is a graph showing a relationship between a solution viscosity of a coating liquid containing spherical magnetic particles and a squareness ratio.

(3-3) Effect of Coating Liquid Viscosity of Coating Liquid (3-3-1) Coating Liquid Containing Spherical $\in$-$Al_{0.5}Fe_{1.5}O_3$ Particles Next, a plurality of spherical-particle-containing coating liquids with different coating liquid viscosities were produced. At first, a magnetization $M_s$ when an external magnetic field of 5 T was applied to each spherical-particle-containing coating liquid was measured. Thereafter, a magnetization $M_{500\ Oe}$ (which is denoted as $M_r$ in the above explanation) when an external magnetic field of 500 Oe was applied to each spherical-particle-containing coating liquid was measured. A squareness ratio $M_{500\ Oe}/M_s$ of the magnetization $M_{500\ Oe}$ relative to the magnetization $M_s$ of each spherical-particle-containing coating liquid was calculated and compared one another. As a result, a measurement result shown in FIG. 6 was obtained. As shown in FIG. 6, it became clear that when the coating liquid viscosity increases to be substantially equal to or greater than 50 cP, the squareness ratio $M_{500\ Oe}/M_s$ decreases. This is because when the coating liquid viscosity increases, rotation of the spherical magnetic particle itself does not occur due to a friction with the exterior, but spinning rotation occurs. Hence, it became clear that in order to cause the spherical magnetic particle itself to be rotated in the magnetization direction and to efficiently produce a regular orientation, it is desirable to maintain the coating liquid viscosity to be equal to or less than 100 cP.

Figure 7:
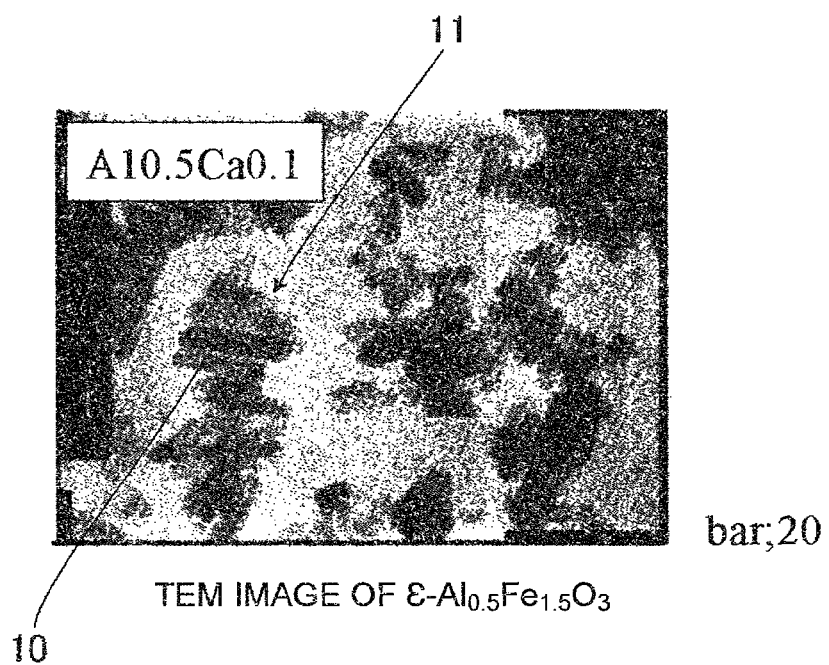
FIG. 7 is a TEM image of a magnetic material slurry containing rod-like $\varepsilon\text{-}Al_{0.5}Fe_{1.5}O_3$ particles.

(3-3-2) Coating Liquid Containing Rod-Like $\in$-$Al_{0.5}Fe_{1.5}O_3$ Particles Next, calcium ions ($Ca^{2+}/Fe^{3+}=0.1$ mol/mol) as a shape control agent was added in the above-explained raw-material solution, thereby producing a magnetic material slurry containing $\in$-$Al_{0.5}Fe_{1.5}O_3$ particles. When an image of the magnetic material slurry was picked up by a transmission electron microscope (TEM), a TEM image shown in FIG. 7 was obtained. It was confirmed from this TEM image that the magnetic material slurry contained rod-like $\in$-$Al_{0.5}Fe_{1.5}O_3$ particles 10.

Next, PEG 500000 of a predetermined concentration was mixed with the magnetic material slurry in order to produce a plurality of rod-like-particle-containing coating liquids with different coating liquid viscosities, and a predetermined external magnetic field was applied to the plurality of rod-like-particle-containing coating liquids, thereby calculating a squareness ratio $M_{500\ Oe}/M_s$ that is a ratio of a magnetization $M_{500\ Oe}$ relative to a magnetization $M_s$ and comparing one another. As a result, a measurement result shown in FIG. 8 was obtained.

Figure 8:
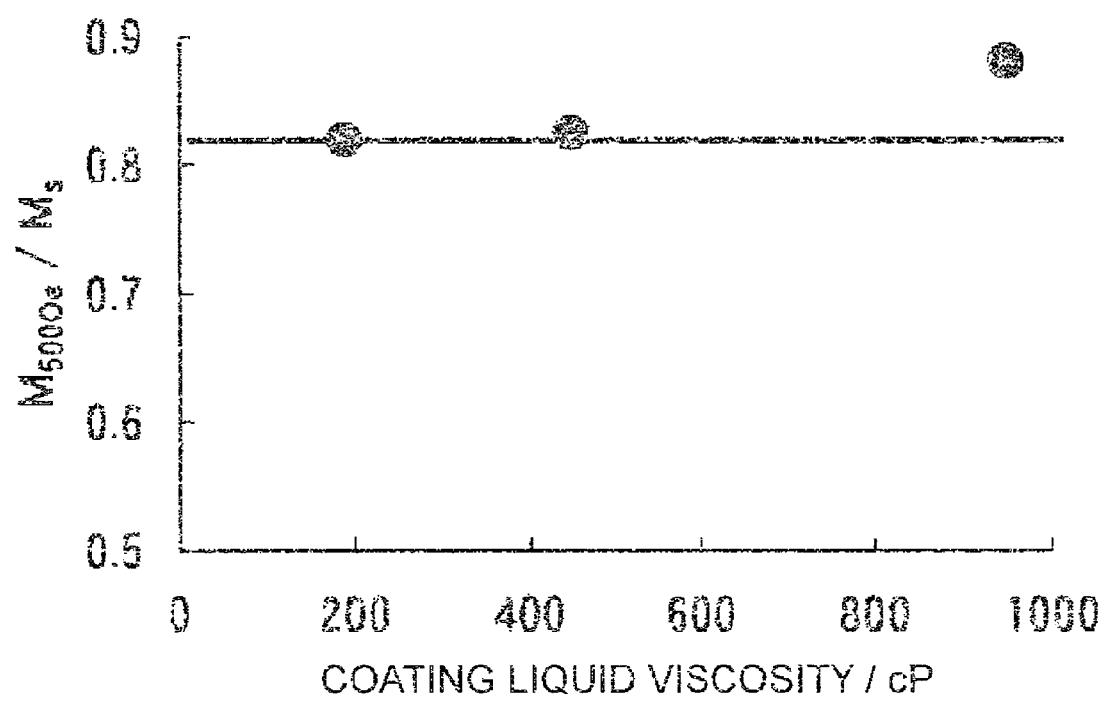
FIG. 8 is a graph showing a relationship between a coating liquid viscosity of a coating liquid containing rod-like magnetic particles and a squareness ratio.

It was confirmed that unlike the spherical-particle-containing coating liquid, such rod-like-particle-containing coating liquids maintained the high squareness ratio $M_{500\ Oe}/M_s$ that did not decrease even if the coating liquid viscosity was substantially 1000 cP as shown in FIG. 8.

(3-4) Squareness Ratio $M_r/M_s$ when Film-Formation Condition was Changed (3-4-1) Production of Magnetic Material Slurry Containing Spherical $\in$-$Al_{0.5}Fe_{1.5}O_3$ Particles First, a magnetic material slurry used for a production of a spherical-particle-containing coating liquid was produced through the following production process. Cetyltrimethylammonium bromide of 35.2 g as a surfactant agent was dissolved in octane of 183 mL, 1-butanol of 36 mL and water of 60 mL in order to produce a micelle solution, and ferric-nitrate-9-hydrate of 2.25 g and aluminum-nitrate-9-hydrate of 0.6966 g were dissolved in the micelle solution in order to produce a raw-material solution.

Next, separately from the raw-material solution, cetyltrimethylammonium bromide of 17.6 g as a surfactant agent was dissolved in octane of 91.5 mL, 1-butanol of 18 mL and water of 20 mL in order to produce a micelle solution, and a 25-% ammonium solution of 10 mL was mixed as a neutralizer in the micelle solution in order to produce a neutralizer solution.

Next, the neutralizer solution was added in the raw-material solution in order to produce a mixed solution, and the mixed solution was let reacted for substantially 30 minutes to produce ferric-hydroxide-based compound particles. Tetraethoxysilane of 15 mL was added in the mixed solution and reacted for substantially 20 hours, thereby producing silica-coated ferric-hydroxide-based compound particles having surfaces of ferric-hydroxide-based compound particles coated with silica ($SiO_2$).

The silica-coated ferric-hydroxide-based compound particles as a precursor were subjected to a calcination process of calcining such particles at a temperature of substantially 1100° C. in order to let such particles to be powdered, thereby producing heat-treated powders. Next, the heat-treated powders were added in an NaOH aqueous solution of 10 wt %, stirred for a day at a temperature of 70° C., and subjected to a centrifugal separation process by a centrifugal separator. Thereafter, precipitants were collected and rinsed by a rinsing solution.

Moreover, the rinsed precipitants were again added in an NaOH aqueous solution of 10 wt %, stirred for a day at a temperature of 70° C., and subjected to a centrifugal separation process by a centrifugal separator. Thereafter, precipitants were collected and rinsed. Such precipitants collected in this way were spherical $\in$-$Al_{0.5}Fe_{1.5}O_3$ particles that were Al-substituted $\in$-$Fe_2O_3$ particles having silica ($SiO_2$) eliminated.

Next, with moisture being left by not through a dry process, a solid content concentration was adjusted (by a purification process) to be 10 wt % (the first embodiment), thereby producing a magnetic material slurry (hereinafter, referred to as $\in$-$Al_{0.5}Fe_{1.5}O_3$ water slurry) containing spherical $\in$-$Al_{0.5}Fe_{1.5}O_3$ particles.

(3-4-2) First Example

Next, the $\in$-$Al_{0.5}Fe_{1.5}O_3$ water slurry of 10 wt % and a PEG 500000 aqueous solution of 10 wt % were mixed together at a ratio by weight of 1:1. Water was added in this solution, and the addition of water was terminated when the solution viscosity became 56 cP, and the solution was taken as a coating liquid. A PET film as a film-formation target was subjected to a so-called bar-coating by this coating liquid, and immediately dried for substantially 30 minutes at a room temperature in a superconducting magnet with an external magnetic field of 2 T, thereby producing a magnetic thin film.

Thereafter, the magnetization of a magnetic material of the first example having the magnetic thin film formed in this manner was measured by an SQUID (superconducting quantum interference flux meter). As a result, according to the first example, as shown in a following table 1, the squareness ratio $M_r/M_s$ that is a ratio of a residual magnetization $M_r$ relative to a saturated magnetization $M_s$ was 0.73.

TABLE 1

| | Applied Magnetic Field [T] | Coating Liquid Viscosity [cP] | Apply Period [min] | Film $M_r/M_s$ |
|---|---|---|---|---|
| 1st Example | 2 | 56 | 30 | 0.73 |
| 2nd Example | 2 | 99 | 30 | 0.65 |
| 1st Comparative Example | 2 | 164 | 30 | 0.59 |
| 2nd Comparative Example | 0 | 56 | 30 | 0.53 |
| 3rd Comparative Example | 1 | 56 | 30 | 0.63 |
| 4th Comparative Example | 2 | 56 | 1 | 0.53 |

According to the table 1, the intensity of the external magnetic field applied which was a film-formation condition is expressed as "applied magnetic field", the viscosity of a coating liquid which was also a film-formation condition is expressed as "coating liquid viscosity", and a time period for applying the external magnetic field which was also a film-formation condition is expressed as "apply period". Moreover, in the table 1, the squareness ratio $M_r/M_s$ of the magnetic material is expressed as "film $M_r/M_s$".

Accordingly, it was confirmed that when, as the film-formation conditions, the applied magnetic field was 2 T, the coating liquid viscosity was 56 cP, and the applied period was substantially 30 minutes, the squareness ratio $M_r/M_s$ became equal to or greater than 0.65, and the residual magnetization was improved in comparison with prior arts.

(3-4-3) Second Embodiment

Next, the $\in$-$Al_{0.5}Fe_{1.5}O_3$ water slurry of 10 wt % and a PEG 500000 aqueous solution were mixed together at a ratio by weight of 1:1. Water was added in this solution, and the addition of water was terminated when the solution viscosity became 99 cP, and the solution was taken as a coating liquid. A PET film was subjected to a so-called bar-coating by this coating liquid, and immediately dried for 30 minutes at a room temperature in a superconducting magnet with an external magnetic field of 2 T, thereby producing a magnetic thin film.

Thereafter, the magnetization of a magnetic material of the second example having the magnetic thin film formed in this manner was measured by an SQUID. As a result, according to the second example, as shown in the table 1, the squareness ratio $M_r/M_s$ was 0.65. Accordingly, it was confirmed that when, as the film-formation conditions, the applied magnetic field was 2 T, the coating liquid viscosity was 99 cP, and the applied period was substantially 30 minutes, the squareness ratio $M_r/M_s$ became equal to or greater than 0.65, and the residual magnetization was improved in comparison with prior arts.

(3-4-4) First Comparative Example

Next, the $\in\text{-Al}_{0.5}\text{Fe}_{1.5}\text{O}_3$ water slurry of 10 wt % and a PEG 500000 aqueous solution of 10 wt % were mixed together at a ratio by weight of 1:1. Water was added in this solution, and the addition of water was terminated when the solution viscosity became 164 cP, and the solution was taken as a coating liquid. A PET film was subjected to a so-called bar-coating by this coating liquid, and immediately dried for substantially 30 minutes at a room temperature in a superconducting magnet with an external magnetic field of 2 T, thereby producing a magnetic thin film.

Thereafter, the magnetization of a magnetic material of the first comparative example having the magnetic thin film formed in this manner was measured by an SQUID. As a result, according to the first comparative example, as shown in the table 1, the squareness ratio $M_r/M_s$ was 0.59.

Accordingly, it was confirmed that when, as a film-formation condition, the coating liquid viscosity was 164 cP that was higher than those of the first and second examples, the squareness ratio $M_r/M_s$ became equal to or smaller than 0.65, and the residual magnetization was insufficient. Hence, it became clear that a coating liquid viscosity of less than 100 cP is desirable as a film-formation condition.

(3-4-5) Second Comparative Example

Next, the $\in\text{-Al}_{0.5}\text{Fe}_{1.5}\text{O}_3$ water slurry of 10 wt % and a PEG 500000 aqueous solution of 10 wt % were mixed together at a ratio by weight of 1:1. Water was added in this solution, and the addition of water was terminated when the solution viscosity became 56 cP, and the solution was taken as a coating liquid. A PET film was subjected to a so-called bar-coating by this coating liquid, and dried for substantially 30 minutes at a room temperature without an application of an external magnetic field, thereby producing a magnetic thin film.

Thereafter, the magnetization of a magnetic material of the second comparative example having the magnetic thin film formed in this manner was measured by an SQUID. As a result, according to the second comparative example, as shown in the table 1, the squareness ratio $M_r/M_s$ was 0.53.

Accordingly, it was confirmed that when, as a film-formation condition, no external magnetic field was applied, the squareness ratio $M_r/M_s$ became equal to or smaller than 0.65, and the residual magnetization was insufficient. Hence, it became clear that an application of an external magnetic field is a requisite film-formation condition.

(3-4-6) Third Comparative Example

Next, the $\in\text{-Al}_{0.5}\text{Fe}_{1.5}\text{O}_3$ water slurry of 10 wt % and a PEG 500000 aqueous solution of 10 wt % were mixed together at a ratio by weight of 1:1. Water was added in this solution, and the addition of water was terminated when the solution viscosity became 56 cP, and the solution was taken as a coating liquid. A PET film was subjected to a so-called bar-coating by this coating liquid, and immediately dried for substantially 30 minutes at a room temperature in a superconducting magnet with an external magnetic field of 1 T, thereby producing a magnetic thin film.

Thereafter, the magnetization of a magnetic material of the third comparative example having the magnetic thin film formed in this manner was measured by an SQUID. As a result, according to the third comparative example, as shown in the table 1, the squareness ratio $M_r/M_s$ was 0.63.

Accordingly, it was confirmed that when, as a film-formation condition, the external magnetic field was 1 T smaller than those of the first and second examples, the squareness ratio $M_r/M_s$ became equal to or smaller than 0.65, and the residual magnetization was insufficient to orient the magnetic particles in the magnetization direction. Hence, it became clear that an application of the external magnetic field of equal to or greater than 2 T to this coating liquid is a requisite film-formation condition.

(3-4-7) Fourth Comparative Example

Next, the $\in\text{-Al}_{0.3}\text{Fe}_{1.5}\text{O}_3$ water slurry of 10 wt % and a PEG 500000 aqueous solution of 10 wt % were mixed together at a ratio by weight of 1:1. Water was added in this solution, and the addition of water was terminated when the solution viscosity became 56 cP, and the solution was taken as a coating liquid. A PET film was subjected to a so-called bar-coating by this coating liquid, and immediately dried for substantially one minute at a room temperature in a superconducting magnet with an external magnetic field of 2 T. A sample was taken out from a superconducting magnet, and dried for substantially 30 minutes at a room temperature as it is, thereby producing a magnetic thin film.

Thereafter, the magnetization of a magnetic material of the fourth comparative example having the magnetic thin film formed in this manner was measured by an SQUID. As a result, according to the fourth comparative example, as shown in the table 1, the squareness ratio $M_r/M_s$ was 0.53.

Accordingly, it was confirmed that when, as a film-formation condition, an apply period was shorter than those of the first and second examples, the squareness ratio $M_r/M_s$ became equal to or smaller than 0.65, and the apply period was insufficient to orient the magnetic particles in the magnetization direction. Hence, it became clear that the continuation of an application of the external magnetic field until the coating liquid is cured is a requisite film-formation condition.

(3-5) Relationship Between Shape of Magnetic Particles in Coating Liquid and Magnetic Characteristic of Coating Liquid Next, a first coating liquid containing spherical $\in\text{-Al}_{0.5}\text{Fe}_{1.5}\text{O}_3$ particles and second to fourth coating liquids containing three kinds of rod-like $\in\text{-Fe}_2\text{O}_3$ particles with different aspect ratios were produced. An explanation will be given of the first to fourth coating liquids at first in detail, and respective magnetic characteristics of the first to fourth coating liquids will be explained next.

(3-5-1) First Coating Liquid

More specifically, regarding the first coating liquid, an $\in$-$Al_{0.42}Fe_{1.5}O_3$ water slurry was produced based on "(3-4-1) Production of Magnetic Material Slurry Containing Spherical $\in$-$Al_{0.5}Fe_{1.5}O_3$ particles", an $\in$-$Al_{0.5}Fe_{1.5}O_3$ slurry water slurry of a predetermined amount and a PEG 500000 aqueous solution of a predetermined amount were mixed together at a predetermined ratio by weight. Water was added in this solution, and the addition of water was terminated when the coating liquid viscosity became 170 cP, thereby taking this solution as the first coating liquid.

Figure 9:
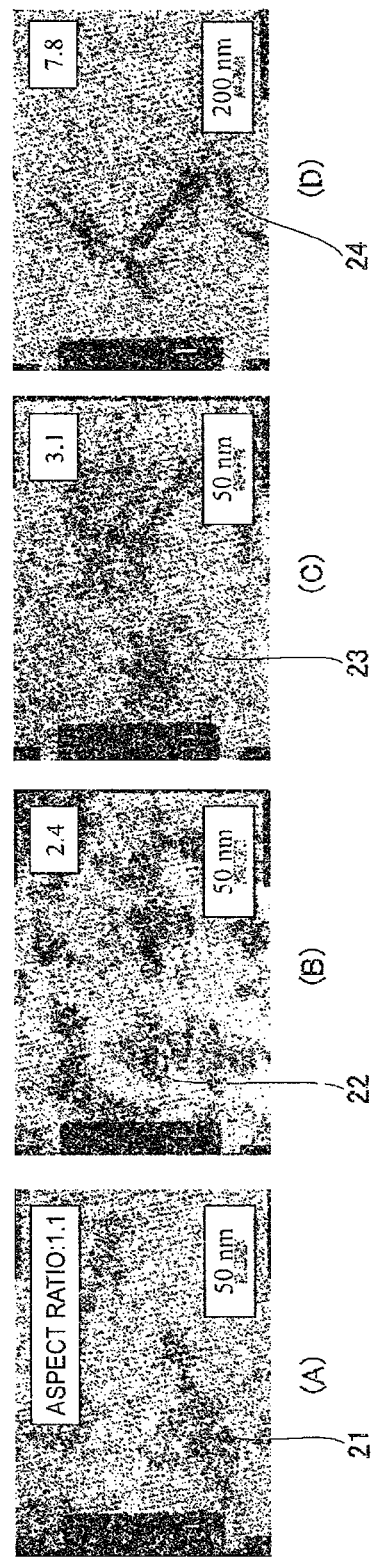
FIG. 9 is TEM images of first to fourth coating liquids containing magnetic particles having different aspect ratios.

When images of the magnetic particles contained in the first coating liquid were picked up by a transmission electron microscope (TEM), a TEM image shown in FIG. 9A was obtained. Based on this TEM image, it was confirmed that the first coating liquid contained substantially spherical $\in$-$Al_{0.5}Fe_{1.5}O_3$ particles 21 having an aspect ratio of 1.1.

(3-5-2) Second Coating Liquid

Next, an explanation will be given of the production method of a second coating liquid. First of all, in order to produce a magnetic material slurry, cetyltrimethylammonium bromide of 35.2 g as a surfactant agent was dissolved in octane of 183 mL, 1-butanol of 36 mL and water of 60 mL to produce a micelle solution, ferric-nitrate-9-hydrate of 2.25 g and aluminum-nitrate-9-hydrate of 0.70 g were dissolved in the micelle solution, and calcium-nitrate-4-hydrate of 0.176 g ($Ca^{2+}/(Fe^{3+}+Al^{3+})$=0.1) as a shape control agent was dissolved in the micelle solution, thereby producing a raw-material solution.

Separately from the raw-material solution, cetyltrimethylammonium bromide of 17.6 g as a surfactant agent was dissolved in octane of 91.5 mL, 1-butanol of 18 mL and water of 10 mL in order to produce a micelle solution, and a 25-% ammonium solution of 10 mL was mixed as a neutralizer in the micelle solution in order to produce a neutralizer solution.

Next, the neutralizer solution was added in the raw-material solution in order to produce a mixed solution, and the mixed solution was let reacted for substantially 30 minutes to produce ferric-hydroxide-based compound particles. Tetraethoxysilane of 15 mL was added in the mixed solution and reacted for substantially 20 hours, thereby producing silica-coated ferric-hydroxide-based compound particles having surfaces of ferric-hydroxide-based compound particles coated with silica ($SiO_2$).

The silica-coated ferric-hydroxide-based compound particles as a precursor were subjected to a calcination process of calcining such particles at a temperature of substantially 1000° C. in order to let such particles to be powdered, thereby producing heat-treated powders. Next, the heat-treated powders were added in an NaOH aqueous solution of 10 wt %, stirred for a day at a temperature of 70° C., and subjected to a centrifugal separation process by a centrifugal separator. Thereafter, precipitants were collected and rinsed.

Thereafter, the rinsed precipitants were again added in an NaOH aqueous solution of 10 wt %, stirred for a day at a temperature of 70° C., and subjected to a centrifugal separation process by a centrifugal separator. Thereafter, precipitants were collected and rinsed. Such precipitants collected in this way were $\in$-$Fe_2O_3$ particles having silica ($SiO_2$) eliminated.

Next, with moisture being left by not through a dry process, a solid content concentration was adjusted to be 10 wt %, thereby producing a magnetic material slurry containing $\in$-$Fe_2O_3$ particles. Subsequently, a magnetic material slurry of a predetermined amount and a PEG 500000 aqueous solution of a predetermined amount were mixed at a predetermined ratio by weight. Water was added in this solution, and the addition of water was terminated when the solution viscosity became 170 cP. It was taken as the second coating liquid.

When an image of the second coating liquid was picked up by a transmission electron microscope (TEM), a TEM image shown in FIG. 9B was obtained. Based on this TEM image, it was confirmed that the second coating liquid contained rod-like $\in$-$Fe_2O_3$ particles 22 having an aspect ratio of 2.4.

(3-5-3) Third Coating Liquid

Ferric-nitrate-9-hydrate of 1.95 g and aluminum-nitrate-9-hydrate of 0.98 g were dissolved in a micelle solution, and calcium nitrate of 0.358 g ($Ca^{2+}/(Fe^{3+}+Al^{3+})$=0.2) as a shape control agent was dissolved in the micelle solution, thereby producing a raw-material solution. A third coating liquid was produced through the same production method as that of the second coating liquid using this raw-material solution.

When an image of the third coating liquid was picked up by a transmission electron microscope (TEM), a TEM image shown in FIG. 9C was obtained. Based on this TEM image, it was confirmed that the third coating liquid contained rod-like $\in$-$Fe_2O_3$ particles 23 having an aspect ratio of 3.1.

(3-5-4) Fourth Coating Liquid

Regarding a fourth coating liquid, ferric-nitrate-9-hydrate of 3 g was dissolved in a micelle solution, and barium nitrate of 0.398 g ($Ba^{2+}/Fe^{3+}$=0.2) as a shape control agent was dissolved in the micelle solution, thereby producing a raw-material solution. The fourth coating liquid was produced through the same production method as that of the second coating liquid using this raw-material solution.

When an image of the fourth coating liquid was picked up by a transmission electron microscope (TEM), a TEM image shown in FIG. 9D was obtained. Based on this TEM image, it was confirmed that the fourth coating liquid contained rod-like $\in$-$Fe_2O_3$ particles 24 having an aspect ratio of 7.8.

(3-5-5) Magnetic Characteristics of First to Fourth Coating Liquids

Respective magnetic characteristics of the first to fourth coating liquids produced as explained above were examined. More specifically, an external magnetic field was applied to respective first to fourth coating liquids from substantially 0 to 50000 Oe, and a magnetization M emu $g^{-1}$ when the external magnetic field was decreased was measured. Accordingly, a result shown in FIG. 10 was obtained.

Figure 10:
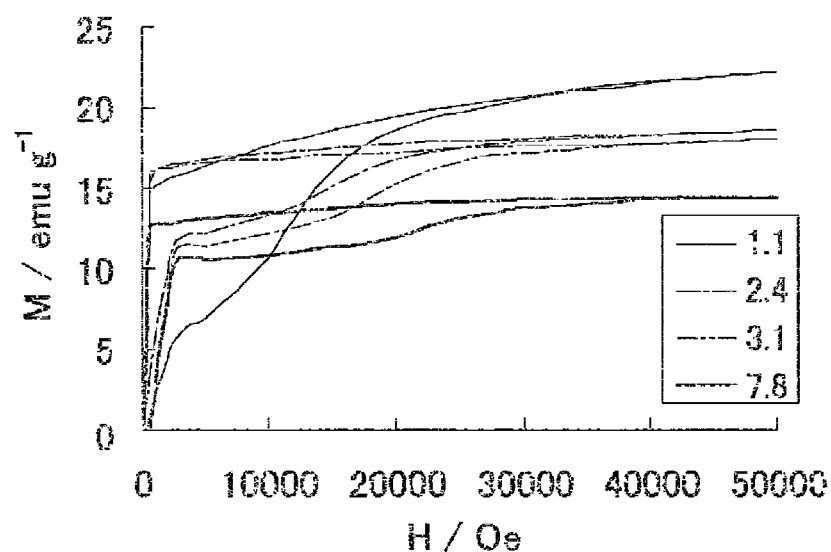
FIG. 10 is a graph showing a relationship between an external magnetic field and magnetization in the first to fourth coating liquids.
Figure 11:
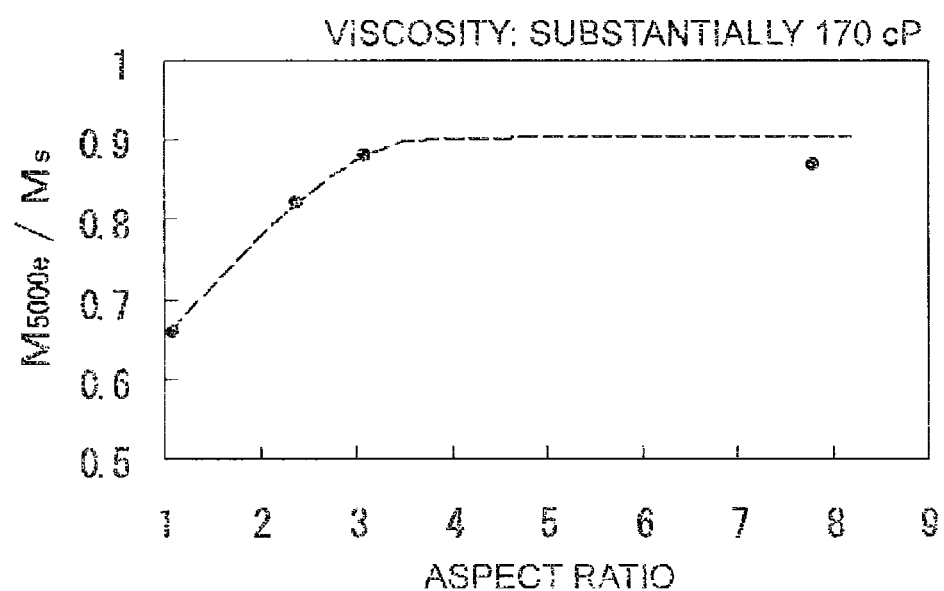
FIG. 11 is a graph showing a relationship between an aspect ratio of a magnetic particle and a squareness ratio.

Based on the result shown in FIG. 10, a squareness ratio $M_{500\,Oe}/M_s$ that was a ratio of a residual magnetization $M_{500\,Oe}$ relative to a saturated magnetization $M_s$ was calculated for each of the first to fourth coating liquids, and a relationship between such a squareness ratio $M_{500\,Oe}/M_s$ and each aspect ratio of magnetic particles (i.e., $\in$-$Al_{0.5}Fe_{1.5}O_3$ particles 21 and 22, $\in$-$Al_{0.7}Fe_{1.3}O_3$ particles 23, and ∈-Fe$_2$O$_3$ particles 24) was examined. Accordingly, a result shown in FIG. 11 was obtained. Hence, it was confirmed that as shown in FIG. 11, the coating liquid had the squareness ratio M$_{500\ Oe}$/M$_s$ which became high as the aspect ratio of the magnetic particles became high, and the magnetic particles having a higher aspect ratio had a larger residual magnetization.

The reason why the coating liquid containing particles with a higher aspect ratio had a higher squareness ratio M$_{500\ Oe}$/M$_s$ is as follows. It was confirmed that in the case of the rod-like-particle-containing coating liquid, rod-like ∈-Fe$_2$O$_3$ particles were dispersed in a solution but a plurality of ∈-Al$_x$Fe$_{2-x}$O$_3$ particles were bonded together with respective lengthwise directions being aligned in the substantially same direction to produce another particle (hereinafter, referred to as a rod-like secondary particle). Moreover, it is known that the rod-like ∈-Al$_x$Fe$_{2-x}$O$_3$ particles form an axis of easy magnetization along respective lengthwise directions.

Moreover, in the case of the spherical-particle-containing coating liquid containing spherical ∈-Al$_x$Fe$_{2-x}$O$_3$ particles, it was confirmed that spherical ∈-Al$_x$Fe$_{2-x}$O$_3$ particles were dispersed in a solution, but a plurality of ∈-Al$_x$Fe$_{2-x}$O$_3$ particles were bonded together to produce another particle (hereinafter, referred to as a spherical secondary particle).

In consideration of those points, it was supposed that the reason why the coating liquid having a higher aspect ratio had a higher squareness ratio M$_{500\ Oe}$/M$_s$ thereof was that the rod-like ∈-Al$_x$Fe$_{2-x}$O$_3$ particles having an axis of easy magnetization formed along respective lengthwise directions were bonded together with respective lengthwise directions aligned one another, and all axes of easy magnetization of the ∈-Fe$_2$O$_3$ particles bonded in a rod-like secondary particle were aligned in one direction, so that such particles were easily oriented by an external magnetic field in comparison with spherical magnetic particles having axes of easy magnetization not aligned.

(3-5-6) Magnetic Characteristic of Orientation Film Produced Using First and Fourth Coating Liquids Next, the viscosity of the first coating liquid containing spherical ∈-Al$_{0.5}$Fe$_{1.5}$O$_3$ particles 21 with an aspect ratio of 1.1 was adjusted to substantially 5 cP. This coating liquid was applied to a PET film, and the first coating liquid was cured with an external magnetic field of equal to or greater than substantially 2 T being applied thereto in order to produce an orientation film (hereinafter, referred to as a spherical-particle orientation film). Hence, a magnetic thin film having the spherical ∈-Al$_{0.5}$Fe$_{1.5}$O$_3$ particles 21 oriented regularly in a magnetization direction by the external magnetic field was formed on the PET film.

Separately from this magnetic thin film, the viscosity of the first coating liquid was adjusted to about 5 cP. This first coating liquid was applied to a PET film, and the first coating liquid was cured without an application of an external magnetic field in order to produce an orientation film (hereinafter, referred to as a first comparative-example film). Hence, a magnetic thin film having the spherical ∈-Al$_{0.5}$Fe$_{1.5}$O$_3$ particles 21 oriented in respective arbitrary directions was formed on the PET film.

Figure 12:
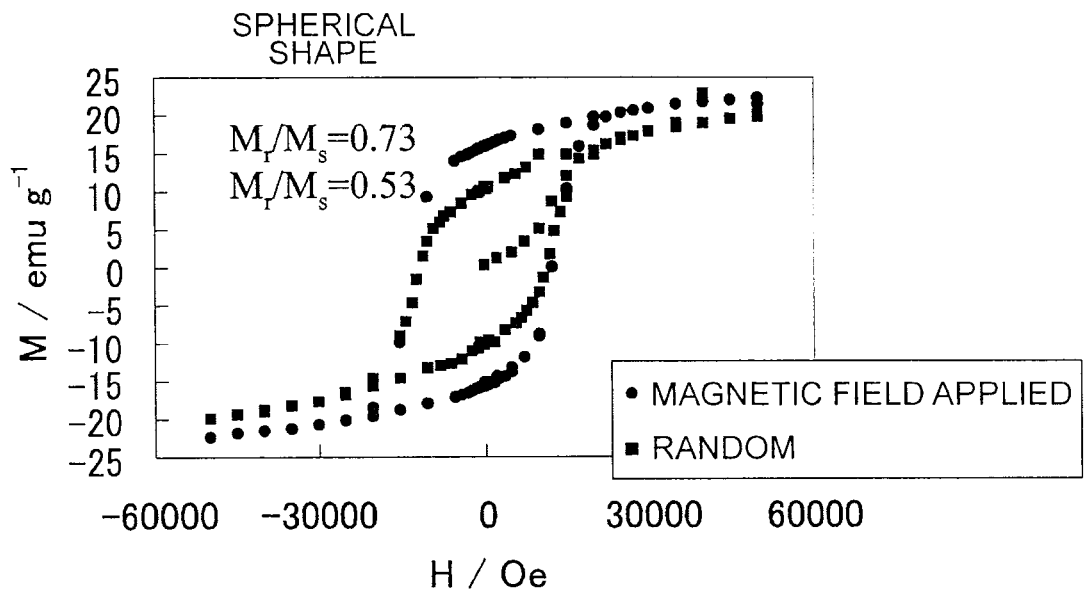
FIG. 12 is a graph showing magnetic hysteresis loops of a spherical-particle oriented film and a film of a first comparative example.

Respective magnetic hysteresis loops of the spherical-particle orientation film and the first comparative-example film were measured, and a result shown in FIG. 12 was obtained. As is clear from FIG. 12, the squareness ratio M$_r$/M$_s$ of the spherical-particle orientation film was 0.73 (indicated by black dots in FIG. 12 as "magnetic field applied"), and the squareness ratio M$_r$/M$_s$ of the first comparative-example film was 0.53 (indicated by black rectangles in FIG. 12 as "random"). Based on this result, it was confirmed that according to the present invention, the spherical ∈-Al$_{0.5}$Fe$_{1.5}$O$_3$ particles 21 can be fixed while being oriented regularly in the magnetization direction, and thus the residual magnetization is improved in comparison with prior arts.

Next, the viscosity of the fourth coating liquid containing rod-like ∈-Fe$_2$O$_3$ particles 24 with an aspect ratio of 7.8 was adjusted to substantially 5 cP. This fourth coating liquid was applied to a PET film, and the fourth coating liquid was cured with an external magnetic field of equal to or greater than substantially 2 T being applied thereto in order to produce an orientation film (hereinafter, referred to as a rod-like-particle orientation film). Hence, a magnetic thin film having the rod-like ∈-Fe$_2$O$_3$ particles 24 oriented regularly in a magnetization direction by the external magnetic field was formed on the PET film.

Separately from this magnetic thin film, the viscosity of the fourth coating liquid was adjusted to about 5 cP. This fourth coating liquid was applied to a PET film, and the fourth coating liquid was cured without an application of an external magnetic field in order to produce an orientation film (hereinafter, referred to as a second comparative-example film). Hence, a magnetic thin film having the rod-like ∈-Fe$_2$O$_3$ particles 24 oriented in respective arbitrary directions was formed on the PET film.

Figure 13:
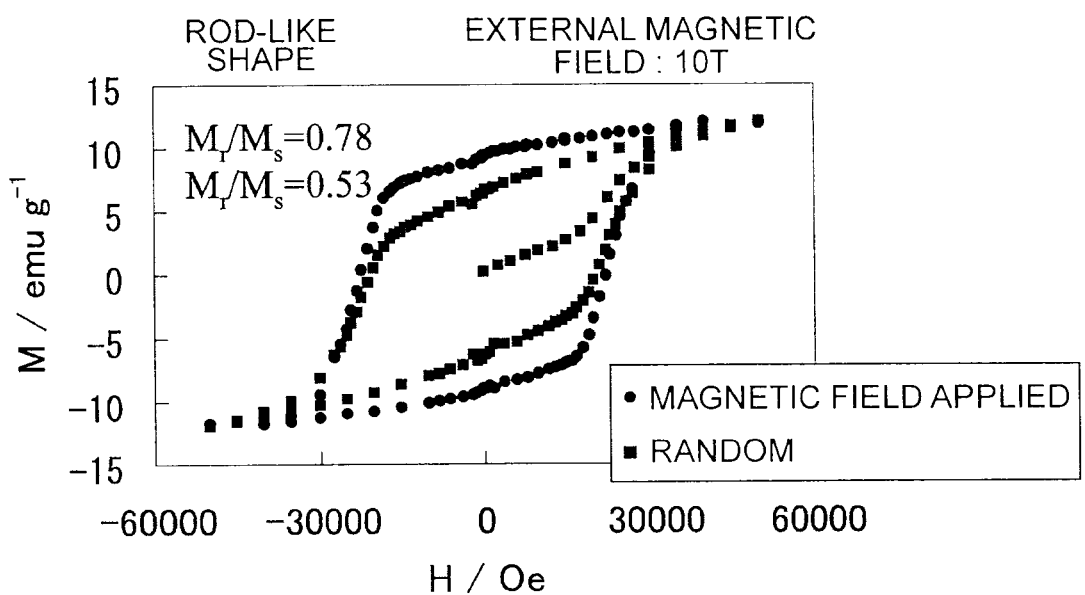
FIG. 13 is a graph showing magnetic hysteresis loops of a rod-particle oriented film and a film of a second comparative example.

Respective magnetic hysteresis loops of the rod-like-particle orientation film and the second comparative-example film were measured, and a result shown in FIG. 13 was obtained. As is clear from FIG. 13, the squareness ratio M$_r$/M$_s$ of the rod-like-particle orientation film was 0.78 (indicated by black dots in FIG. 13 as "magnetic field applied"), and the squareness ratio M$_r$/M$_s$ of the second comparative-example film was 0.53 (indicated by black rectangles in FIG. 13 as "random"). Based on this result, it was confirmed that according to the present invention, the rod-like ∈-Fe$_2$O$_3$ particles 24 can be fixed while being oriented regularly in the magnetization direction, and thus the residual magnetization is improved in comparison with prior arts.

In addition, it was confirmed that the rod-like-particle orientation film had a higher squareness ratio M$_r$/M$_s$ than the squareness ratio M$_r$/M$_s$ of the spherical-particle orientation film, and further improved the residual magnetization in comparison with the spherical-particle orientation film.

(4) Third Embodiment (4-1) Structure of Magnetic Thin Film

Figure 14:
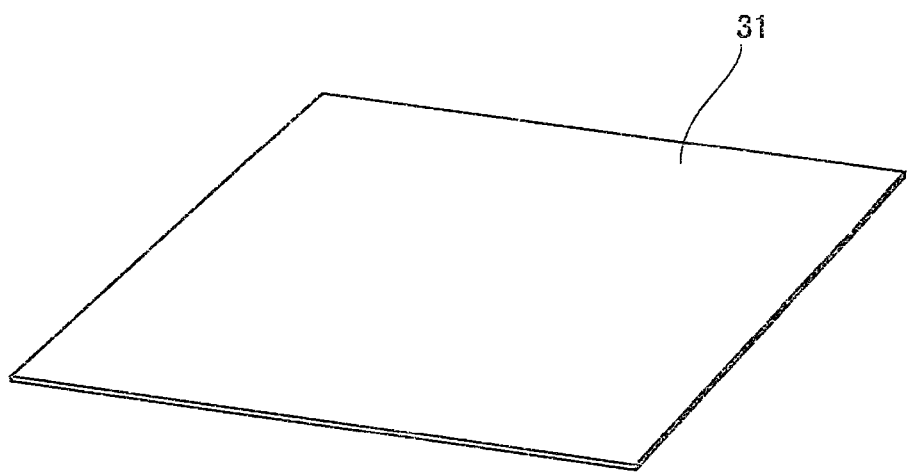
FIG. 14 is a schematic diagram showing a whole structure of a magnetic thin film according to a third embodiment.

In FIG. 14, a reference numeral 31 represents a magnetic thin film according to a third embodiment, and this magnetic thin film 31 is formed of a magnetic material slurry containing magnetic particles that contains equal to or greater than 99 wt % of the epsilon-type iron-oxide-based compounds (i.e., any one of ∈-Fe$_2$O$_3$, ∈-A$_x$Fe$_{2-x}$O$_3$, and ∈-B$_y$-C$_z$Fe$_{2-y-z}$O$_3$), which has insulation properties, is a hard ferrite layer serving as a permanent magnet, and has a squareness ratio M$_r$/M$_s$ that is a ratio of a residual magnetization M$_r$ relative to a saturated magnetization M$_s$ of equal to or greater than 0.65.

In practice, the magnetic thin film 31 is formed as a sheet, and has a film thickness set to be equal to or smaller than 1 mm. The magnetic thin film 31 can be a thin millimeter-wave absorbing sheet since the epsilon-type iron-oxidebased compounds can absorb electromagnetic wave in a millimeter wave range (30 to 300 GHz), because of resonance phenomenon of magnetization. Such a magnetic thin film 31 can control the phase of electromagnetic wave (waves) in the film by a controlled film thickness, and has a high electromagnetic-wave absorbing function (absorbing capability of electromagnetic wave) by an optimization of the film thickness even if the magnetic thin film is thin.

Moreover, in the production process, like the first and second embodiments, an external magnetic field with a predetermined intensity is continuously applied to magnetic thin film 31 until the coating liquid produced by adjusting the coating liquid viscosity of the magnetic material slurry is dried and cured. As a result, the magnetic thin film has a structure in which the magnetic particles are oriented in the magnetization direction.

Hence, according to the magnetic thin film 31 of the third embodiment, since the magnetic particles are oriented in the magnetization direction by applying an external magnetic field thereto before the coating liquid is cured, and are fixed as those are, the axis of easy magnetization of the magnetic particles is oriented in the magnetization direction of the external magnetic field, thereby improving the residual magnetization.

(4-2) Production Method of Magnetic Thin Film

Next, an explanation will be given below of a production method of the magnetic thin film 31. In this case, first of all, a magnetic material slurry containing magnetic particles that contains equal to or greater than 99 wt % of the epsilon-type iron-oxide-based compounds (i.e., any one of $\in\text{-Fe}_2\text{O}_3$, $\in\text{-A}_x\text{Fe}_{2-x}\text{O}_3$, and $\in\text{-B}_y\text{C}_z\text{Fe}_{2-y-z}\text{O}_3$) is produced. This magnetic material slurry is produced in accordance with "(1-2-6) Production Method of Magnetic Material Slurry" by not through a dry process, or is produced through a dry process as shown in FIG. 3 in the above-explained "(2) Second Embodiment".

Next, water-soluble polymers like polyvinyl-alcohol or water-dispersible polymers like acrylic-resin emulsion were mixed with the magnetic material slurry in order to produce a coating liquid that had a good dispersibility of the epsilon-type iron-oxide-based compounds. Next, the coating liquid of the predetermined amount was applied to a film-formation target formed of, for example, a tabular substrate, and was dried and cured. At this time, according to the third embodiment, an external magnetic field of a predetermined intensity also was continuously applied to the coating liquid from a predetermined direction while the coating liquid was dried and cured by magnetic field applying means like a superconducting magnet in order to rotate the magnetic particles on the film-formation target and to orient such particles regularly in the predetermined magnetization direction.

Finally, the sheet-like magnetic thin film 31 cured on the film-formation target was peeled from the film-formation target, thereby producing the magnetic thin film 31 that can serve as a thin millimeter-wave absorbing sheet. According to the above explanation of the present embodiment, the magnetic thin film 31 was peeled from the film-formation target in order to obtain only the magnetic thin film 31, and such a magnetic thin film 31 was used as the thin millimeter-wave absorbing sheet. The present invention is, however, not limited to the above-explained case, and a magnetic material forming the magnetic thin film 31 on a film-formation target formed of a soft film-like member may be produced and such a magnetic material may be used as the thin millimeter-wave absorbing sheet.

(4-3) Electromagnetic-Wave Absorbing Function

First of all, it was examined whether or not the magnetic thin film produced without an application of an external magnetic field when a coating liquid was cured had an electromagnetic-wave absorbing function. A magnetic thin film formed of $\in\text{-Ga}_{0.51}\text{Fe}_{1.49}\text{O}_3$ and having polyvinyl-alcohol as a binder was produced as an examination sample. More specifically, a magnetic material slurry formed of $\in\text{-Ga}_{0.51}\text{Fe}_{1.49}\text{O}_3$ (18.5 pts. wt. of $\in\text{-Ga}_{0.51}\text{Fe}_{1.49}\text{O}_3$) and a PVA (polyvinyl-alcohol) 1000 aqueous solution (completely suspended type, 10 pts. wt. of polyvinyl-alcohol) were prepared. Next, the magnetic material slurry and the PVA 1000 aqueous solution were mixed together so that the ratio by weight of the magnetic material slurry and the PVA 1000 aqueous solution became 4:1, thereby producing a coating liquid.

Next, this coating liquid was filled in a glass petri dish, and heated at a temperature of 40° C. in order to completely vaporize moisture contained in the coating liquid, thereby producing a magnetic thin film on the glass petri dish. At this time, the coating amount of the coating liquid was adjusted so that the film thickness of the magnetic thin film became 0.3 mm. As a result, the sheet-like magnetic thin film having a film thickness of 0.31 mm was actually produced. In this case, when the coating liquid was cured to produce the magnetic thin film, the coating liquid filled in the glass petri dish was directly cured to produce the magnetic thin film without an application of an external magnetic field.

Next, using the polyvinyl-alcohol as a binder, how much the sheet-like magnetic thin film formed of $\in\text{-Ga}_{0.51}\text{Fe}_{1.49}\text{O}_3$ as explained above absorbed electromagnetic wave was examined. Electromagnetic waves with frequencies changed were emitted to the produced magnetic thin film, and how much the electromagnetic waves reflected by the magnetic thin film were attenuated in comparison with the incident electromagnetic waves to the magnetic thin film (hereinafter, referred to as a reflection loss: RL) was measured.

Figure 15:
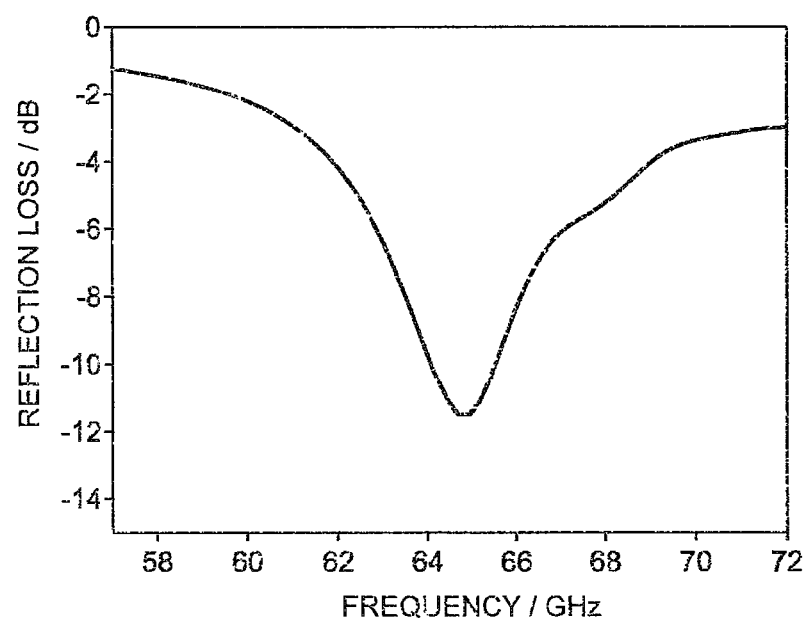
FIG. 15 is a graph showing a relationship between a reflection loss and a frequency.
Figure 16:
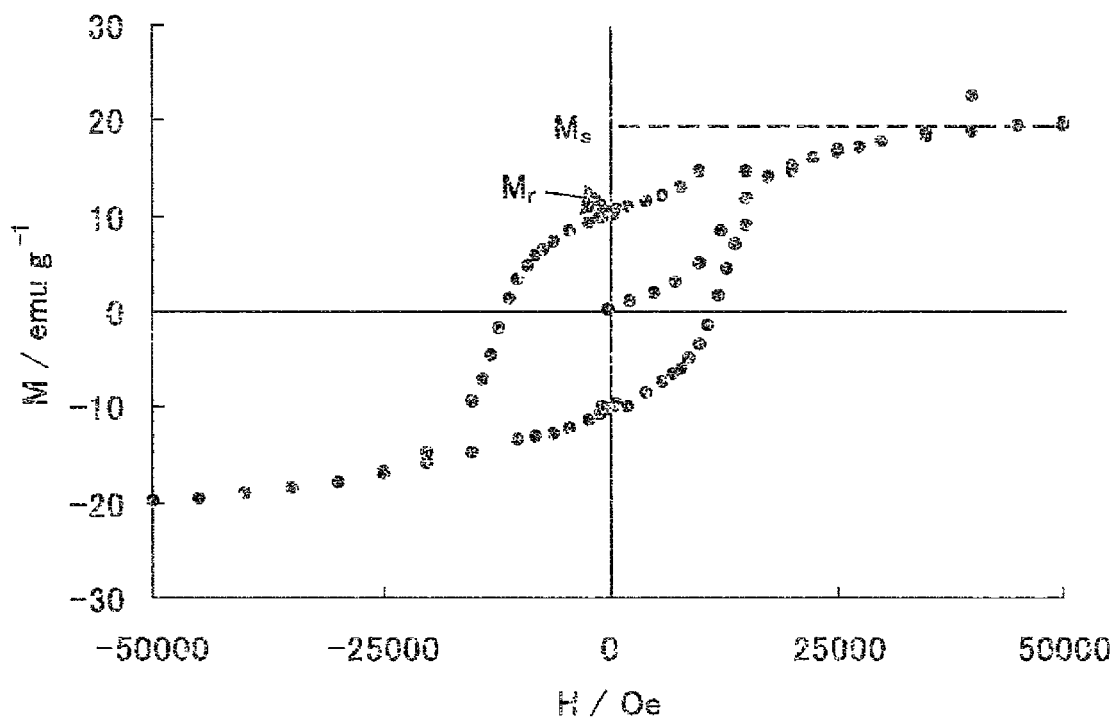
FIG. 16 is a graph showing a magnetic hysteresis loop of a magnetic thin film according to a conventional art.

Accordingly, a measurement result shown in FIG. 15 was obtained. From FIG. 15, a reflection loss of −11.5 dB was accomplished (93% of reflected light was absorbed) at a frequency of 65 GHz. The magnetic thin film showed a high electromagnetic-wave absorbing function even though it was a thin sheet-like sample. This is because the film thickness of 0.31 mm was appropriate for the wavelength of the electromagnetic wave at 60 GHz band from the standpoint of the phase control of the electromagnetic wave. It can be understood from the following calculation indicated by a following formula 3.

The reflection loss when electromagnetic wave with a wavelength of λ is emitted to a sheet-like magnetic thin film with a film thickness of d can be calculated from the following formula 3 (in the formula, RL indicates the reflection loss).

$$RL = 10\log\left|\frac{\sqrt{\frac{\mu_r}{\varepsilon_r}}\left(\tanh j\frac{2\pi d}{\lambda}\sqrt{\varepsilon_r\mu_r}\right) - 1}{\sqrt{\frac{\mu_r}{\varepsilon_r}}\left(\tanh j\frac{2\pi d}{\lambda}\sqrt{\varepsilon_r\mu_r}\right) + 1}\right|^2 \quad \text{[Formula 3]}$$

In the formula, $\mu_r$ is a relative permeability of the magnetic thin film, $\in_r$ is a dielectric constant of the magnetic thin film, and j is an imaginary unit. However, the above formula 3 is satisfied only when a metal plate is pasted on the rear face of the magnetic thin film in order to prevent electromagnetic waves emitted to the magnetic thin film from passing through the magnetic thin film. In practice, when the ratio by weight of the magnetic material slurry and the PVA 1000 aqueous solution was 4:1 and the film thickness of the magnetic thin film was set to be 0.3 mm, it was indicated that the reflection loss was suppressed to be about −20 dB (99% of reflected light was absorbed).

As explained above, according to the magnetic thin film produced without an application of an external magnetic field when the coating liquid was cured, even if such a magnetic thin film was thin, it was confirmed that the magnetic thin film can serve as a thin millimeter-wave absorbing sheet having a high electromagnetic-wave absorbing function. Based on this examination result, it is clear that the magnetic thin film 31 produced by letting the coating liquid cured while applying an external magnetic field can obtain a high electromagnetic-wave absorbing function when the same coating liquid as that of the examination is used. At this time, the magnetic thin film 31 produced by letting the coating liquid cured while applying the external magnetic field, since the axes of easy magnetization of the magnetic particles are oriented in the magnetization direction of the external magnetic field, can obtain a higher electromagnetic-wave absorbing function relative to electromagnetic wave emitted from the magnetization direction.

In this case, when the direction of the axis of easy magnetization and the incident direction of electromagnetic wave are parallel to each other, the electromagnetic-wave absorbing function increases. Accordingly, the electromagnetic-wave absorbing function can be enhanced if the axis of easy magnetization is oriented to the exterior of the surface of the sheet (the magnetic thin film 31) and aligned with the incident direction of the electromagnetic wave. As explained above, the magnetic thin film 31 of the present invention has insulation properties, can serve as a permanent magnet, has the residual magnetization improved in comparison with the prior arts, and can be a thin millimeter-wave absorbing sheet having a high electromagnetic-wave absorbing function even if such a magnetic thin film is thin.

The invention claimed is:

1. A process for production of a magnetic thin film, the process comprising:
   producing a mixed solution by mixing a raw-material solution to which calcium ions as a shape control agent are added in the amount of equal to or smaller than 8 wt % with a neutralizer solution to which a neutralizer is added such that a precipitation reaction of ferric-hydroxide-based compound particles progresses in the mixed solution;
   producing silica-coated ferric-hydroxide-based compound particles by adding silane compounds to the mixed solution;
   producing thermally processed powders by separating the silica-coated ferric-hydroxide-based compound particles from the mixed solution and calcining the silica-coated ferric-hydroxide-based compound particles;
   producing magnetic particles by adding the thermally processed powders to an aqueous solution such that silica coating the thermally processed powders is completely eliminated, the magnetic particles being formed of epsilon-type iron-oxide-based compounds, having insulation properties, and serving as a permanent magnet, each magnetic particle being in a rod-like shape having a long-axis size equal to or longer than 100 nm and an aspect ratio equal to or higher than 3.1 and providing a magnetic domain wall therein;
   producing a magnetic material slurry having a ratio of an average particle diameter of the magnetic particles by a dynamic light scattering method to an observed average particle diameter of the magnetic particles by an observation through a transmission electron microscope equal to or less than five by purifying the aqueous solution, in which the magnetic particles are dispersed, with a pH adjustment and a solid content concentration adjustment without a dry process;
   producing a coating liquid having a solution viscosity in a range from 170 cP to 1000 cP by mixing a polymer consisting of polyvinyl-alcohol aqueous solution or PEG aqueous solution with the magnetic material slurry;
   coating a film-formation target with the coating liquid; and
   curing the coating liquid coating the film-formation target while applying an external magnetic field with a predetermined intensity to the coating liquid and forming a magnetic thin film, wherein the external magnetic field is continuously applied during a time period until the coating liquid is dried and cured, and wherein a ratio of residual magnetization $M_r$ relative to saturated magnetization $M_s$ of the magnetic thin film is equal to or greater than 0.78.

2. The process according to claim 1, wherein the external magnetic field has an intensity equal to or greater than 2 T.

3. The process according to claim 1, wherein the magnetic particles dispersed in a solution of the coating liquid contain equal to or greater than 99 wt % of the epsilon-type iron-oxide-based compounds.

4. The process according to claim 1, wherein the epsilon-type iron-oxide-based compounds are each at least one of the following: $\in\text{-Fe}_2\text{O}_3$; $\in\text{-A}_x\text{Fe}_{2-x}\text{O}_3$ (where A is an element other than Fe and 0<x<2); and $\in\text{-B}_y\text{C}_z\text{Fe}_{2-y-z}\text{O}_3$ (where B and C are elements other than A and Fe and mutually different elements and 0<y<1 and 0<z<1).

5. A magnetic thin film comprising:
   magnetic particles formed of epsilon-type iron-oxide-based compounds, the magnetic particles having insulation properties and serving as a permanent magnet, each magnetic particle being in a rod-like shape having a long-axis size equal to or longer than 100 nm and an aspect ratio equal to or higher than 3.1 and providing a magnetic domain wall therein; and
   a polymer consisting of polyvinyl-alcohol or PEG, wherein
   the magnetic particles are oriented in a predetermined direction in accordance with an external magnetic field applied when the magnetic thin film is formed, and a ratio of residual magnetization $M_r$ relative to saturated magnetization $M_s$ of the magnetic thin film is equal to or greater than 0.78.

6. The magnetic thin film according to claim 5, wherein the magnetic particles containing equal to or greater than 99 wt % of the epsilon-type iron-oxide-based compounds are dispersed and arranged in the magnetic thin film and a thickness of the magnetic thin film is 10 μm or less and a haze is equal to or lower than 40%.

7. The magnetic thin film according to claim 5, wherein the epsilon-type iron-oxide-based compounds are each at least one of the following: $\in\text{-Fe}_2\text{O}_3$; $\in\text{-A}_x\text{Fe}_{2-x}\text{O}_3$ (where A is an element other than Fe and 0<x<2); and ∈-B$_y$C$_z$Fe$_{2-y-z}$O$_3$ (where B and C are elements other than A and Fe and mutually different elements and 0<y<1 and 0<z<1).

8. A magnetic thin film comprising:

a predetermined area including magnetic particles formed of epsilon-type iron-oxide-based compounds, the magnetic particles having insulation properties and serving as a permanent magnet, each magnetic particle being in a rod-like shape having a long-axis size equal to or longer than 100 nm and an aspect ratio equal to or higher than 3.1 and providing a magnetic domain wall therein, and a polymer consisting of polyvinyl-alcohol or PEG; and another area including the magnetic particles and the polymer, wherein the magnetic particles in the predetermined area are oriented in a predetermined direction in accordance with an external magnetic field applied when the magnetic thin film is formed, and the magnetic particles in the other area are oriented in a direction different from the predetermined direction, and a ratio of residual magnetization M$_r$ relative to saturated magnetization M$_s$ of the magnetic thin film in the predetermined area is equal to or greater than 0.78.

9. The magnetic thin film according to claim 5, wherein the magnetic thin film absorbs electromagnetic wave of a millimeter-wave range from 30 to 300 GHz.

10. A magnetic material comprising the magnetic thin film according to claim 5 on a film-formation target.

11. The magnetic thin film according to claim 5, comprising a rod-like secondary particle formed of a plurality of the rod-like shaped magnetic particles bonded together with lengthwise directions aligned, the rod-like secondary particle being oriented in a predetermined direction in accordance with the external magnetic field.

* * * * *